(12) United States Patent
Goto

(10) Patent No.: US 12,537,120 B2
(45) Date of Patent: Jan. 27, 2026

(54) RESISTOR

(71) Applicant: ROHM CO., LTD., Kyoto (JP)

(72) Inventor: Yoichi Goto, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 275 days.

(21) Appl. No.: 18/349,774

(22) Filed: Jul. 10, 2023

(65) Prior Publication Data

US 2023/0352217 A1 Nov. 2, 2023

Related U.S. Application Data

(63) Continuation of application No. 17/424,752, filed as application No. PCT/JP2020/002960 on Jan. 28, 2020, now Pat. No. 11,742,115.

(30) Foreign Application Priority Data

Feb. 7, 2019 (JP) .................................. 2019-020261
Feb. 19, 2019 (JP) .................................. 2019-027116

(51) Int. Cl.
*H01C 1/148* (2006.01)
*H01C 1/142* (2006.01)
(Continued)

(52) U.S. Cl.
CPC .............. *H01C 1/148* (2013.01); *H01C 7/00* (2013.01); *H01C 1/142* (2013.01); *H01C 17/288* (2013.01)

(58) Field of Classification Search
CPC .......... H01C 1/148; H01C 1/142; H01C 7/00; H01C 17/288
See application file for complete search history.

(56) References Cited

U.S. PATENT DOCUMENTS 7,667,568 B2   2/2010   Tanimura et al.
8,111,130 B2   2/2012   Tsukada
(Continued)

FOREIGN PATENT DOCUMENTS

JP   64-51691 A   2/1989
JP   9-330801 A   12/1997
(Continued)

OTHER PUBLICATIONS

Office Action received in the corresponding Japanese Patent application, Oct. 31, 2023 and machine translation (19 pages).
(Continued)

*Primary Examiner* — Kyung S Lee
(74) *Attorney, Agent, or Firm* — HSML P.C.

(57) ABSTRACT

A resistor includes a resistive element, an insulation plate, a protective film, and a pair of electrodes. The resistive element includes a first face and a second face arranged to face in opposite directions in a thickness direction. The insulation plate is on the first face, and the protective film on the second face. The electrodes are spaced apart in a first direction perpendicular to the thickness direction, and held in contact with the resistive element. Each electrode includes a bottom portion opposite to the insulation plate with respect to the resistive element in the thickness direction. Each bottom portion overlaps with a part of the protective film as viewed in the thickness direction. The resistor further includes a pair of intermediate layers spaced apart in the first direction. The intermediate layers are formed of a material electrically conductive and containing a synthetic resin. Each intermediate layer includes a cover portion covering a part of the protective film. The cover portion of each intermediate layer is disposed between the protective film and the bottom portion of one of the electrodes.

16 Claims, 47 Drawing Sheets

(51) Int. Cl.
  *H01C 7/00* (2006.01)
  *H01C 17/28* (2006.01)

(56) References Cited

U.S. PATENT DOCUMENTS

| 8,310,334 | B2 | 11/2012 | Chen et al. |
| 2002/0140053 | A1 | 10/2002 | Lee |
| 2011/0005766 | A1 | 1/2011 | Shand |
| 2016/0240291 | A1 | 8/2016 | Tanaka et al. |
| 2016/0343479 | A1 | 11/2016 | Itou |
| 2020/0051716 | A1 | 2/2020 | Kinoshita et al. |

FOREIGN PATENT DOCUMENTS

| JP | 2001-35702 A | 2/2001 |
| JP | 2005-277019 A | 10/2005 |
| JP | 2009-289770 A | 12/2009 |
| JP | 2011-142117 A | 7/2011 |
| JP | 2013-225602 A | 10/2013 |
| JP | 2015-19023 A | 1/2015 |
| JP | 2016-36002 A | 3/2016 |
| JP | 2016-152301 A | 8/2016 |
| WO | 2018/110288 A1 | 6/2018 |

OTHER PUBLICATIONS

Office Action issued in corresponding Japanese Patent application No. 2023-213211, Dec. 3, 2024 and machine translation (19 pages).
International Search Report issued in PCT/JP2020/002960, Apr. 14, 2020 (2 pages).
Office Action received in the corresponding Japanese Patent application, Sep. 5, 2023 and machine translation (18 pages).

FIG.3 A10

RESISTOR

TECHNICAL FIELD

The present disclosure relates to a resistor, which may be mainly used for current detection.

BACKGROUND ART

Resistors including a resistive element formed of a metal plate are known. Such a resistor is mainly used for current detection. Patent Document 1 discloses an example of the resistor including a resistive element formed of a metal plate. This resistor includes the resistive element, a pair of electrodes formed at respective end portions of a surface of the resistive element that faces in a thickness direction of the resistive element, and a protective film covering the resistive element. A part of the protective film covering the surface of the resistive element is disposed between the pair of electrodes.

When the resistor is made to detect a larger current, the amount of heat generated by the resistive element will increase. When the temperature of the resistive element rises higher owing to the heat, fluctuation in resistance value of the resistor may be incurred. As measures therefor, the surface area of each of the pair of electrodes may be increased, to improve the heat dissipation performance of the resistor. In such a case, the pair of electrodes may be disposed so as to partially overlap with the protective film as viewed in the thickness direction of the resistive element, to suppress an increase in size of the resistor. The pair of electrodes thus configured may be obtained through depositing a metal thin film on the protective film by a sputtering process, and then performing an electrolytic barrel plating.

With the resistor configured as above, however, the portion of the pair of electrodes contacting the protective film may be separated, during the use of the resistor, because of thermal stress generated at the interface between the protective film and each of the pair of electrodes. The separation of the electrode leads to a decline in heat dissipation performance of the resistor, which provokes the fluctuation in resistance value of the resistor. Therefore, some measures have to be taken, to prevent the pair of electrodes from being separated owing to the thermal stress.

PRIOR ART DOCUMENT

Patent Document

Patent Document 1: JP-A-2013-225602

SUMMARY OF INVENTION

Problem to be Solved by the Invention

The present disclosure has been accomplished in view of the foregoing situation, and provides a resistor configured to prevent the separation of the portion of the pair of electrodes overlapping with the protective film as viewed in the thickness direction of the resistive element.

Means to Solve the Problem

In an aspect, the present disclosure provides a resistor including: a resistive element having a first face and a second face arranged to face in opposite directions to each other in a thickness direction; an insulation plate disposed on the first face; a protective film disposed on the second face; and a pair of electrodes spaced apart from each other in a first direction perpendicular to the thickness direction, with each electrode held in contact with the resistive element. The pair of electrodes each include a bottom portion disposed opposite to the insulation plate with respect to the resistive element in the thickness direction. The bottom portion of each of the pair of electrodes overlaps with a part of the protective film as viewed in the thickness direction. The resistor further includes a pair of intermediate layers formed of a material electrically conductive and containing a synthetic resin, where the intermediate layers are spaced apart from each other in the first direction. The pair of intermediate layers each include a cover portion covering a part of the protective film, and the cover portion of each of the pair of intermediate layers is disposed between the protective film and the bottom portion of one of the pair of electrodes.

Other features and advantages of the present disclosure will become more apparent, through detailed description given hereunder with reference to the accompanying drawings.

MODE FOR CARRYING OUT THE INVENTION

Exemplary embodiments of the present disclosure will be described below with reference to the drawings.

First Embodiment

Figure 1:
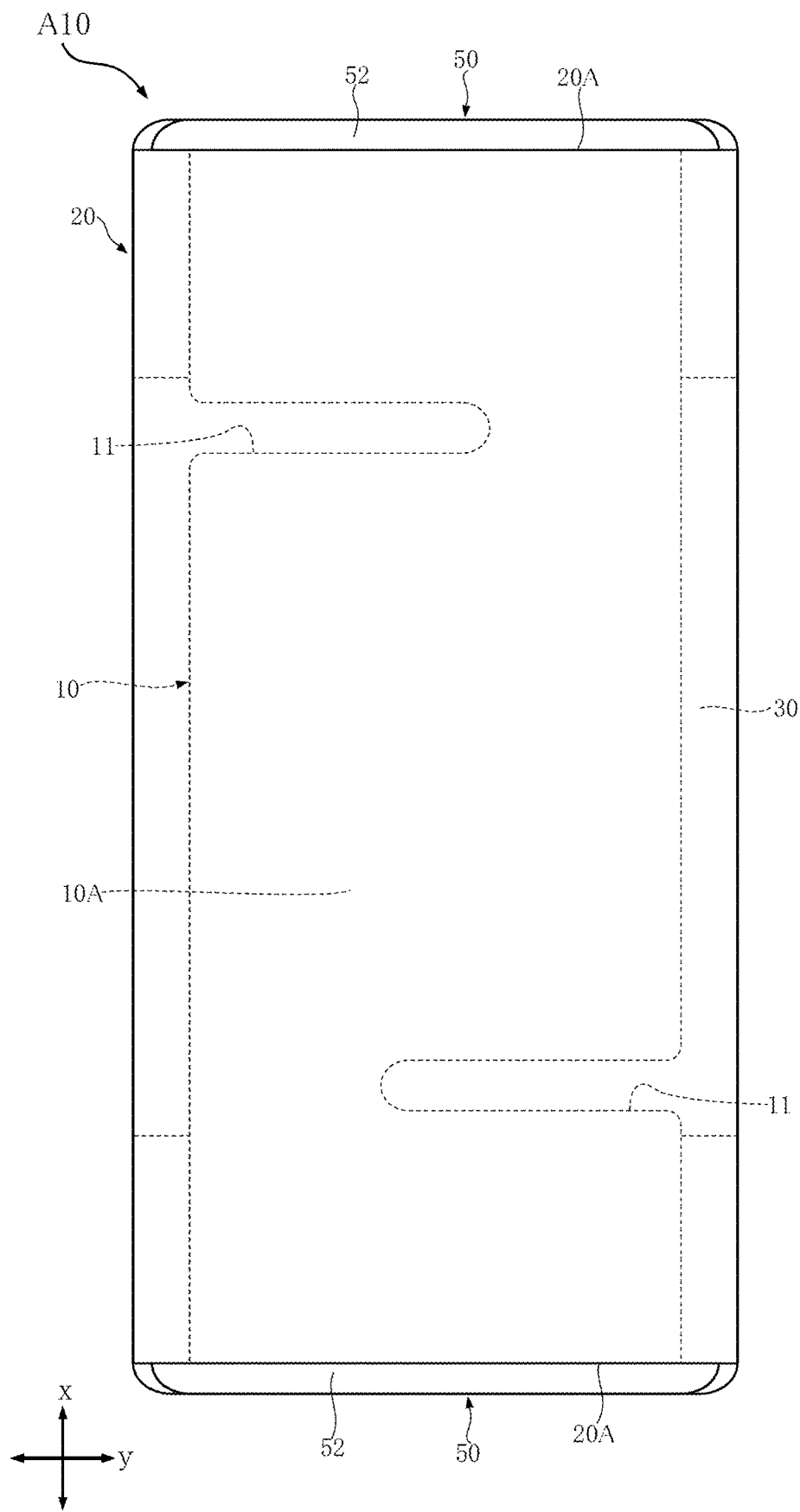
FIG. 1 is a plan view showing a resistor according to a first embodiment of the present disclosure.
Figure 2:
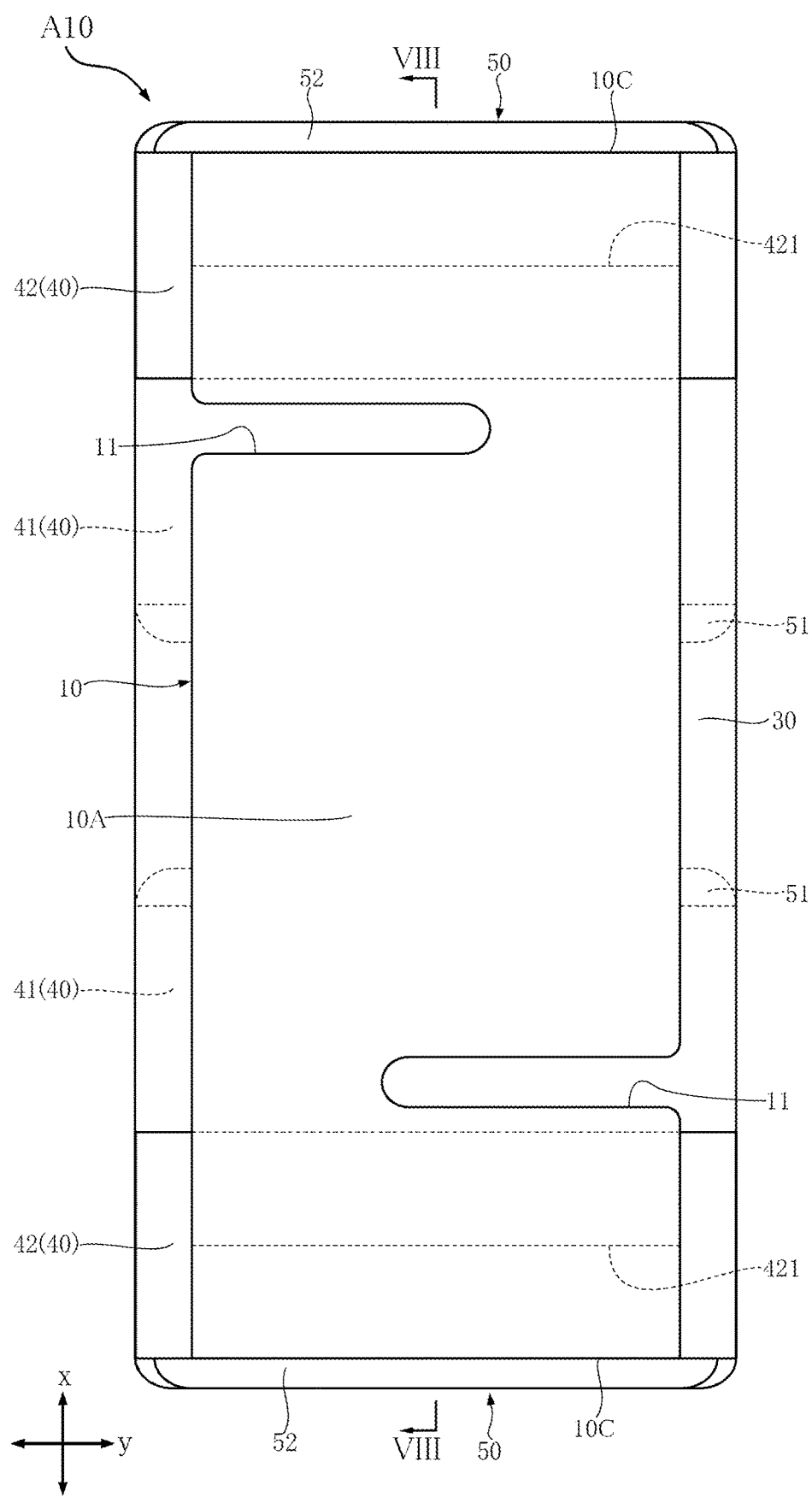
FIG. 2 is a plan view corresponding to FIG. 1, seen through an insulation plate.
Figure 3:
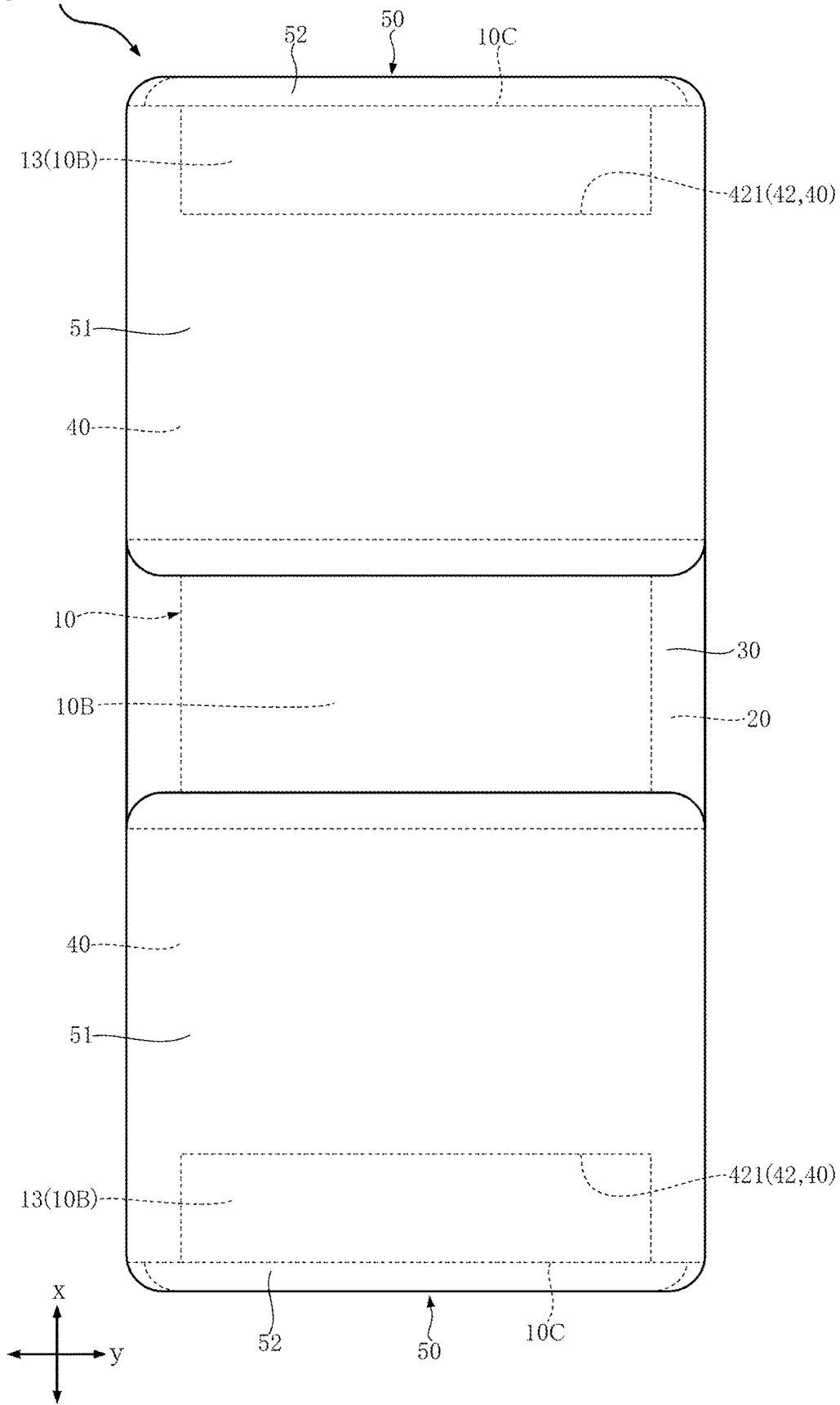
FIG. 3 is a bottom view of the resistor shown in FIG. 1.
Figure 4:
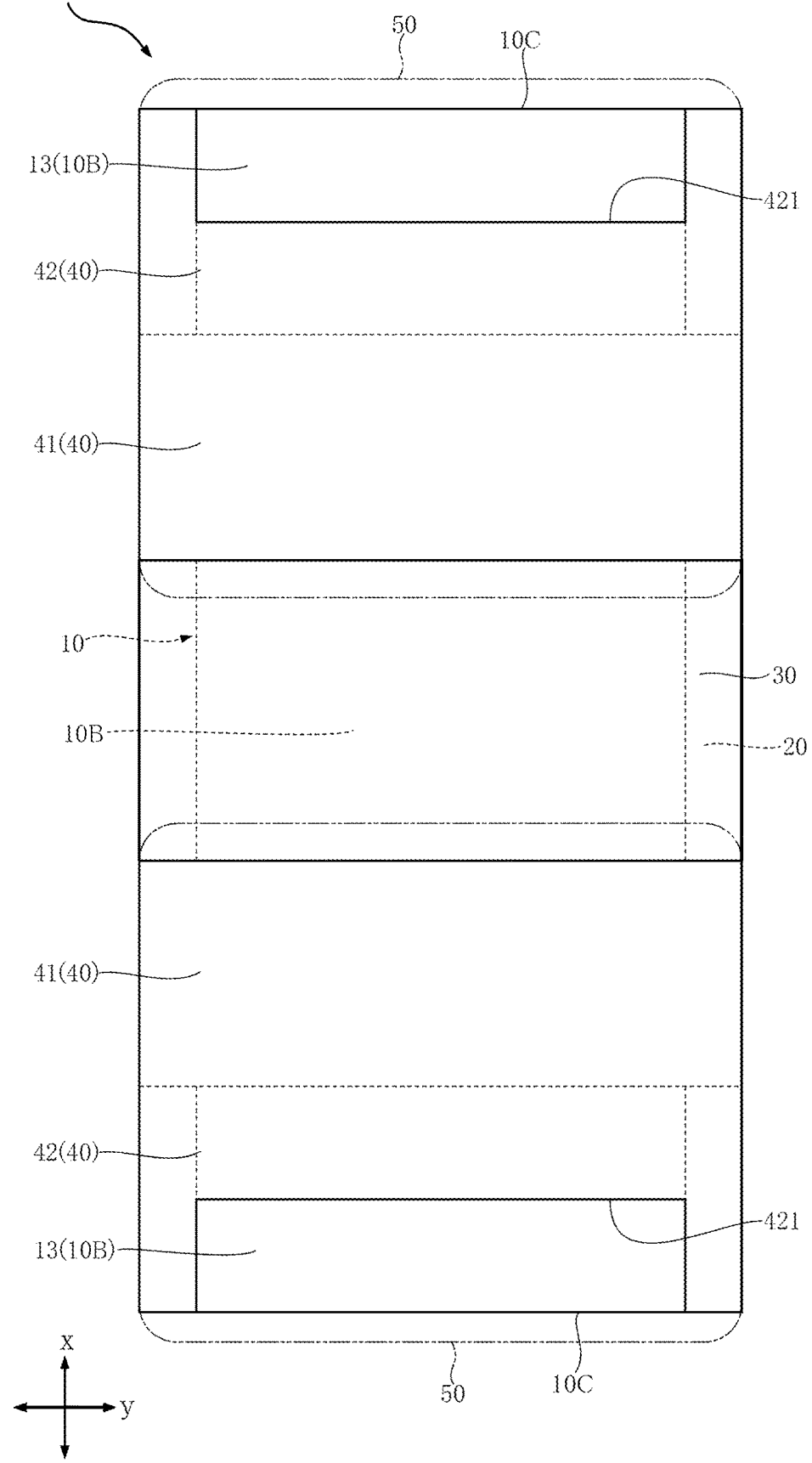
FIG. 4 is a bottom view corresponding to FIG. 3, seen through a pair of electrodes.
Figure 5:
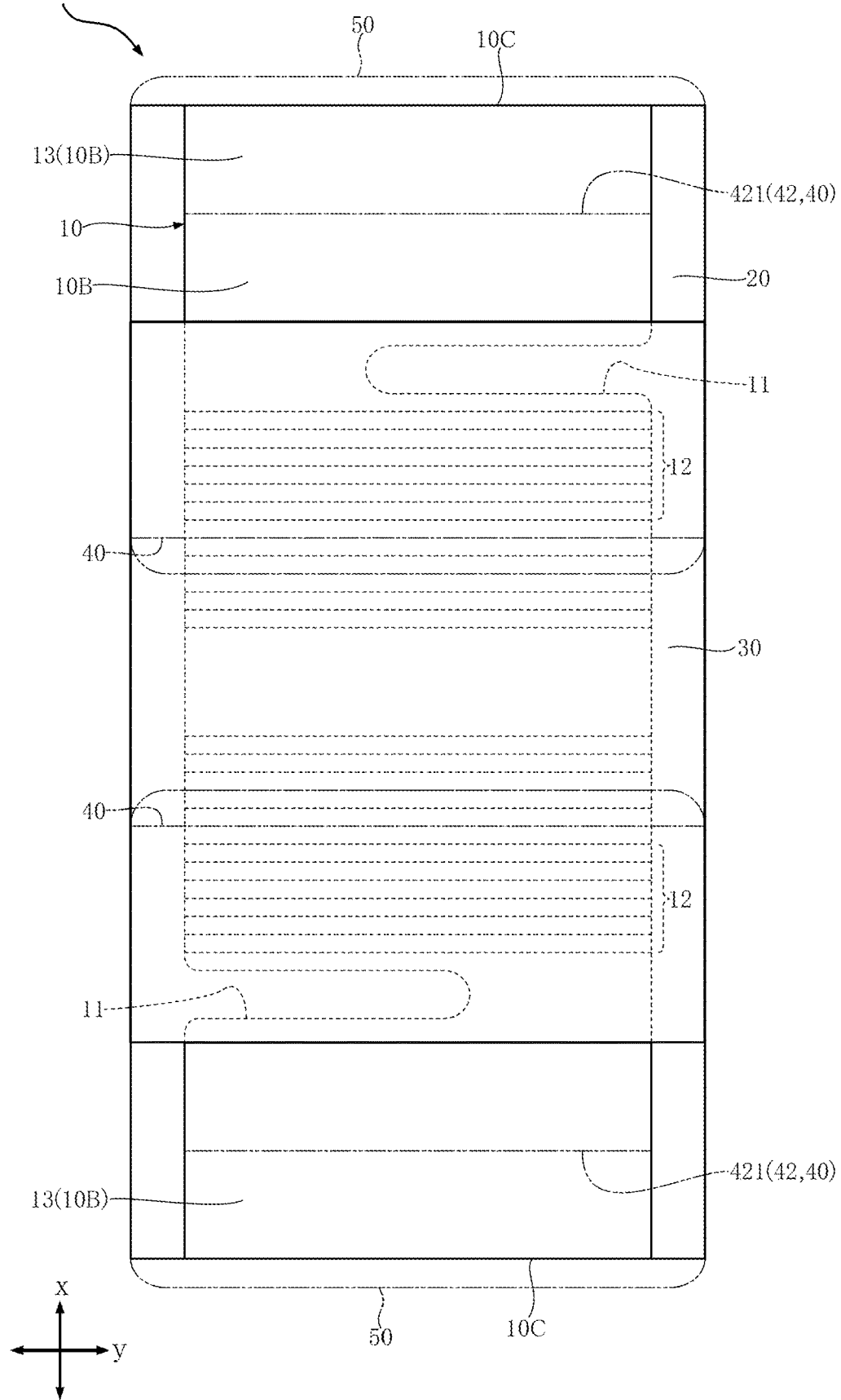
FIG. 5 is a bottom view corresponding to FIG. 3, seen through the pair of electrodes and a pair of intermediate layers.

Referring to FIG. 1 to FIG. 10, a resistor A10 according to a first embodiment of the present disclosure will be described. The resistor A10 is configured as a shunt resistor to be used for current detection. The resistance value of the resistor A10 is generally between 5 mΩ and 220 mΩ, both ends inclusive. The resistor A10 is surface-mounted on a circuit board of various electronic devices. The resistor A10 includes a resistive element 10, an insulation plate 20, a protective film or layer 30, a pair of intermediate layers 40, and a pair of electrodes 50. FIG. 2 illustrates the view seen through the insulation plate 20, for the sake of clarity. FIG. 4 illustrates the view seen through the pair of electrodes 50, for the sake of clarity. FIG. 5 illustrates the view seen through the pair of intermediate layers 40 and the pair of electrodes 50, for the sake of clarity. In these drawings, the pair of intermediate layers 40 and the pair of electrodes 50, which are seen through, are indicated by imaginary lines (dash-dot-dot lines).

For the description of the resistor A10, and also a resistor A20 to a resistor A40 to be subsequently described, the direction along the thickness of the resistive element 10 will be defined as "thickness direction z", for the sake of convenience. One direction perpendicular to the thickness direction z will be defined as "first direction x". The direction perpendicular to both of the thickness direction z and the first direction x will be defined as "second direction y". As shown in FIG. 1, the resistor A10 has a rectangular shape as viewed in the thickness direction z. The first direction x corresponds to the longitudinal direction of the resistor A10. The second direction y corresponds to the lateral direction of the resistor A10.

The resistive element 10 serves as the functional center of the resistor A10. The resistive element 10 is formed of a metal plate. The metal plate is formed of, for example, a copper (Cu)—manganese (Mn)—nickel (Ni) alloy (Manganin, registered trademark), or a copper—manganese—tin (Sn) alloy (Zeranin, registered trademark). The thickness of the resistive element 10 is between 50 μm and 150 μm, both ends inclusive.

Figure 8:
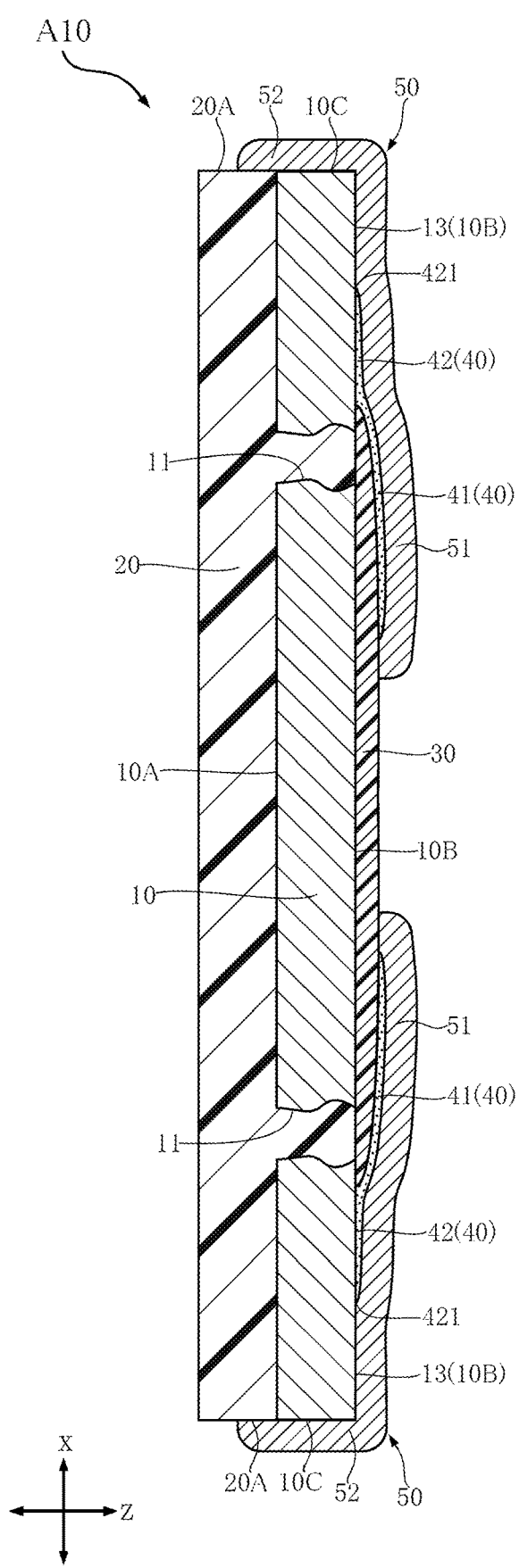
FIG. 8 is a cross-sectional view taken along a line VIII-VIII in FIG. 2.

As shown in FIG. 8, the resistive element 10 includes a first face 10A, a second face 10B, and a pair of first end faces 10C. The first face 10A is arranged to face to one side in the thickness direction z. The second face 10B is arranged to face to the opposite side of the first face 10A. Accordingly, the first face 10A and the second face 10B are arranged to face in opposite directions to each other, in the thickness direction z. The pair of first end faces 10C are spaced apart from each other in the first direction x. The pair of first end faces 10C are each connected to both of the first face 10A and the second face 10B.

Figure 9:
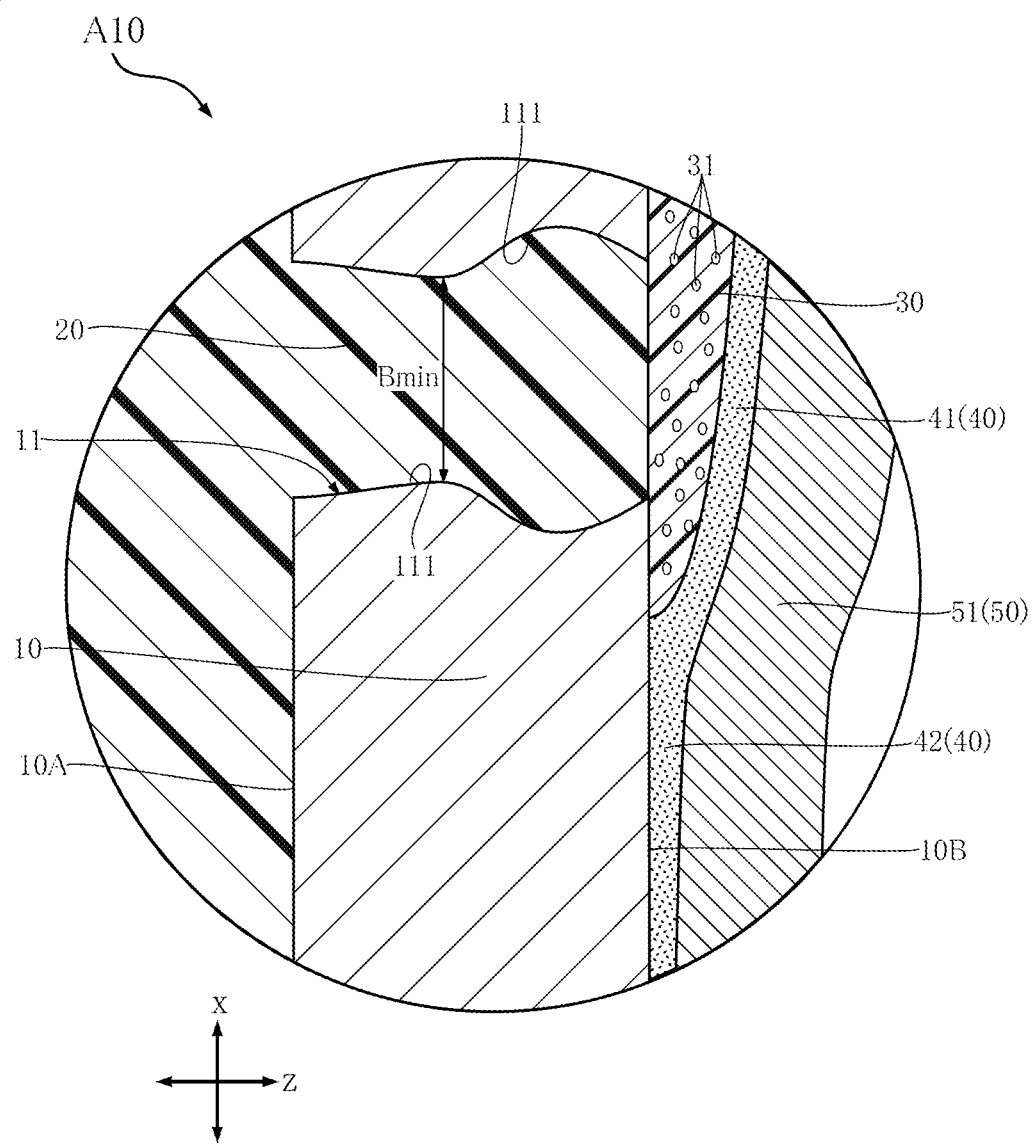
FIG. 9 is a partially enlarged cross-sectional view from FIG. 8.
Figure 10:
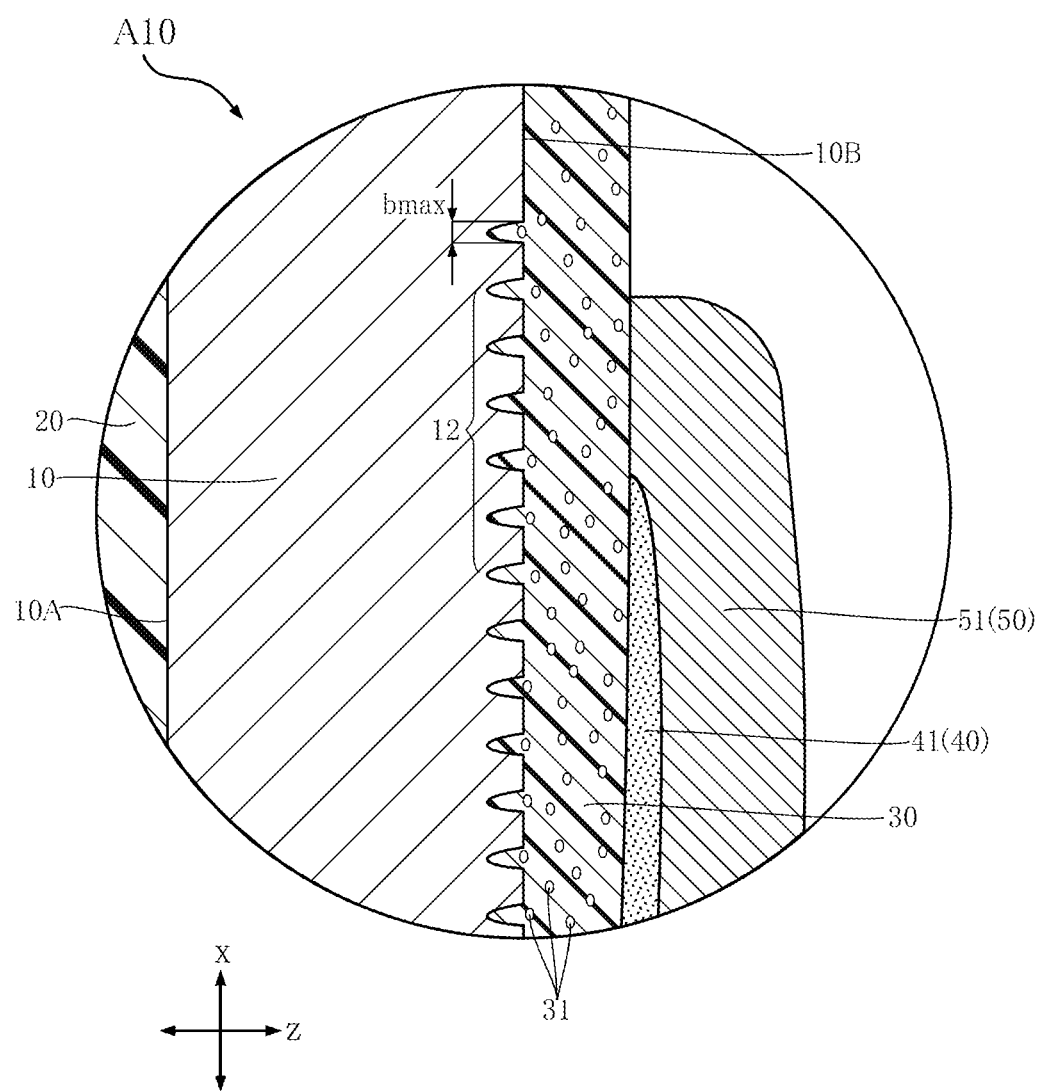
FIG. 10 is a partially enlarged cross-sectional view from FIG. 8.

As shown in FIG. 5, the resistive element 10 includes a plurality of slits 11, and a plurality of grooves 12. The plurality of slits 11 and the plurality of grooves 12 are provided to adjust the resistance value of the resistive element 10 to a predetermined desired value. As shown in FIG. 8, the plurality of slits 11 are each formed so as to penetrate through the resistive element 10, from the first face 10A to the second face 10B. As shown in FIG. 2, the plurality of slits 11 each extend in the second direction y. Because of the plurality of slits 11, an opening is formed in each of the edges of the resistive element 10 in the second direction. As shown in FIG. 9, the plurality of slits 11 each include a pair of sidewalls 111. The pair of sidewalls 111 are spaced apart from each other, in the first direction x. The pair of sidewalls 111 are each connected to both of the first face 10A and the second face 10B. The pair of sidewalls 111 each include a concave portion recessed in the first direction x. As shown in FIG. 5 and FIG. 10, the plurality of grooves 12 are recessed from the second face 10B, and extend in a predetermined direction. In the illustrated example of the resistor A10, the plurality of grooves 12 each extend in the second direction y. As shown in FIG. 10, the maximum width bmax of each of the plurality of grooves 12 is narrower than the minimum width Bmin of the plurality of slits 11 (see FIG.

9). The number of the slits 11 may be determined as desired, depending on the resistance value required from the resistive element 10.

The insulation plate 20 is provided on the first face 10A of the resistive element 10, as shown in FIG. 8. The insulation plate 20 is formed of a material containing a synthetic resin. In the illustrated example of the resistor A10, the insulation plate 20 is formed of a synthetic resin sheet containing an epoxy resin. The insulation plate 20 includes a pair of second end faces 20A. The pair of second end faces 20A are arranged to face in opposite directions in the first direction x, and spaced apart from each other in the first direction x. The pair of second end faces 20A are each flush with one of the pair of first end faces 10C. A part of the insulation plate 20 is filled in the plurality of slits 11 of the resistive element 10, in the thickness direction z.

The protective film 30 is provided on the second face 10B of the resistive element 10, as shown in FIG. 8. The protective film 30 is formed of a material electrically insulative and containing a synthetic resin. In the illustrated example of the resistor A10, the protective film 30 is formed of a material containing an epoxy resin. As shown in FIG. 9 and FIG. 10, the protective film 30 contains a filler 31. The filler 31 is formed of a material containing a ceramic. Preferably, a ceramic having a relatively high thermal conductivity, such as alumina ($Al_2O_3$) or boron nitride (BN), may be employed. The protective film 30 is in contact with the second face 10B, and the surface of the insulation plate 20 arranged to face in the same direction as the second face 10B. As shown in FIG. 5, the protective film 30 is located on the inner side of the pair of first end faces 10C of the resistive element 10 in the first direction x, as viewed in the thickness direction z. As shown in FIG. 10, the protective film 30 is meshed with the plurality of grooves 12 of the resistive element 10.

The pair of intermediate layers 40 are, as shown in FIG. 8, located on the opposite side of the insulation plate 20 with respect to the resistive element 10, in the thickness direction z. The pair of intermediate layers 40 are spaced apart from each other, in the first direction x. The pair of intermediate layers 40 are formed of a material electrically conductive and containing a synthetic resin. The pair of intermediate layers 40 are electrically connected to the resistive element 10. The pair of intermediate layers 40 each contain metal particles. The metal particles include silver (Ag). In the illustrated example of the resistor A10, the synthetic resin contained in the pair of intermediate layers 40 is an epoxy resin. The pair of intermediate layers 40 have an electrical resistivity approximately ten times as high as the electrical resistivity of the resistive element 10. In other words, the pair of intermediate layers 40 are higher in electrical resistivity, than the resistive element 10.

Figure 7:
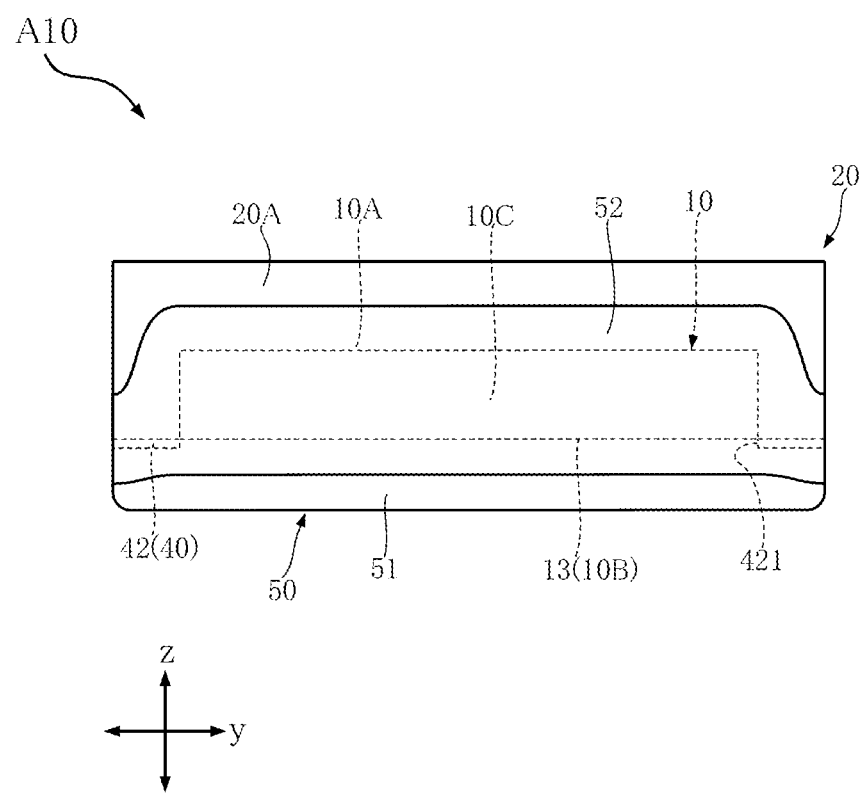
FIG. 7 is a front view of the resistor shown in FIG. 1.

As shown in FIG. 4 and FIG. 8, the pair of intermediate layers 40 each include a cover portion 41 and an extended portion 42. The cover portion 41 is located on the opposite side of the resistive element 10 with respect to the protective film 30, in the thickness direction z. The cover portion 41 covers a part of the protective film 30. The extended portion 42 extends from the cover portion 41 of one of the pair of intermediate layers 40, toward one of the pair of first end faces 10C of the resistive element 10. The extended portion 42 is in contact with the second face 10B of the resistive element 10, and the surface of the insulation plate 20 arranged to face in the same direction as the second face 10B. Accordingly, the pair of intermediate layers 40 are electrically connected to the resistive element 10. As shown in FIG. 4 and FIG. 7, a recess 421 is formed in the extended portion 42 of each of the pair of intermediate layers 40. The recess 421 is formed so as to recede in the first direction x, from one of the pair of first end faces 10C. The recess 421 has a rectangular shape, as viewed in the thickness direction z. As shown in FIG. 4, FIG. 5, and FIG. 8, the second face 10B of the resistive element 10 includes an exposed region 13, located between one of the pair of first end faces 10C and the protective film 30, as viewed in the thickness direction z. The exposed region 13 is not covered with the pair of intermediate layers 40. The exposed region 13 is exposed from the recess 421.

As shown in FIG. 1 to FIG. 3, FIG. 6, and FIG. 8, the pair of electrodes 50 are spaced apart from each other, in the first direction x. The pair of electrodes 50 are each located in contact with the resistive element 10. Accordingly, the pair of electrodes 50 are electrically connected to the resistive element 10. The pair of electrodes 50 each include a plurality of metal layers. In the illustrated example of the resistor A10, the plurality of metal layers include a copper layer, a nickel layer, and a tin layer, stacked in this order from the side of the resistive element 10.

As shown in FIG. 3, and FIG. 6 to FIG. 8, the pair of electrodes 50 each include a bottom portion 51. The bottom portion 51 is located opposite to the insulation plate 20 with respect to the resistive element 10 in the thickness direction z. The bottom portion 51 overlaps with a part of the protective film 30, as viewed in the thickness direction z.

Figure 6:
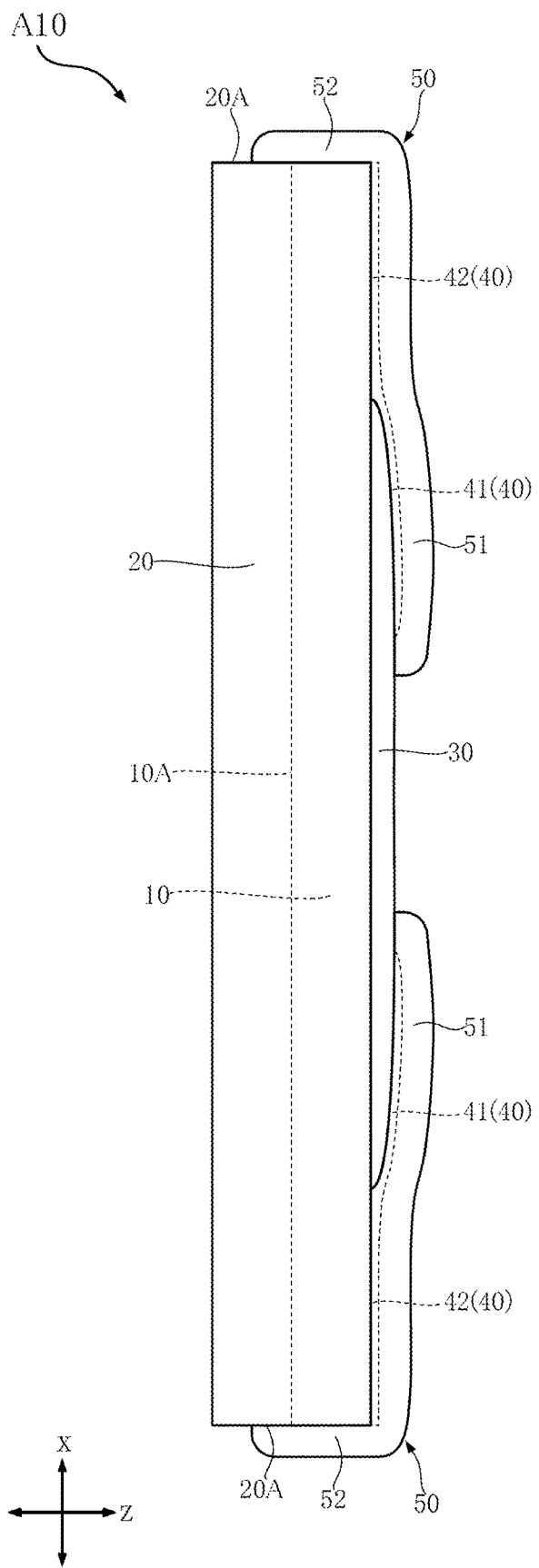
FIG. 6 is a right side view of the resistor shown in FIG. 1.

As shown in FIG. 6 and FIG. 8, the cover portion 41 of each of the pair of intermediate layers 40 is located between the protective film 30 and the bottom portion 51 of one of the pair of electrodes 50. In the resistor A10, the cover portion 41 of each of the pair of intermediate layers 40 is in contact with both of the protective film 30 and the bottom portion 51 of one of the pair of electrodes 50.

As shown in FIG. 6 and FIG. 8, the extended portion 42 of each of the pair of intermediate layers 40 is located between the resistive element 10 and the bottom portion 51 of one of the pair of electrodes 50. The bottom portion 51 of each of the pair of electrodes 50 is in contact with the extended portion 42 of one of the pair of intermediate layers 40. Further, the bottom portion 51 of each of the pair of electrodes 50 is in contact with the exposed region 13 of the second face 10B of the resistive element 10, and the protective film 30.

As shown in FIG. 1 to FIG. 3, and FIG. 6 to FIG. 8, the pair of electrodes 50 each include a lateral portion 52. The lateral portion 52 is connected to the bottom portion 51 of one of the pair of electrodes 50, and erected in the thickness direction z. The lateral portion 52 of each of the pair of electrodes 50 is in contact with one of the pair of first end faces 10C of the resistive element 10. Further, the lateral portion 52 of each of the pair of electrodes 50 is in contact with one of the pair of second end faces 20A of the insulation plate 20.

Hereunder, an exemplary manufacturing method of the resistor A10 will be described, with reference to FIG. 11 to FIG. 15. Here, FIG. 11 to FIG. 15 represent the same cross-sectional position as FIG. 8.

Figure 11:
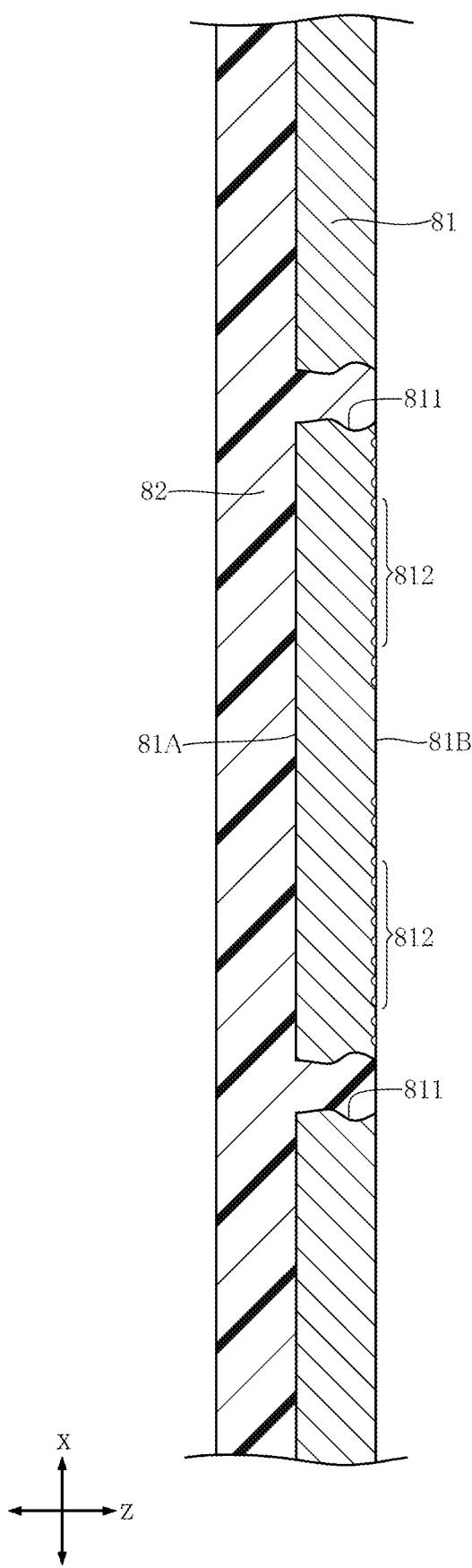
FIG. 11 is a cross-sectional view for explaining a manufacturing process of the resistor shown in FIG. 1.

Referring first to FIG. 11, a base material 82 is thermally press-bonded to a resistive element 81, having a first face 81A and a second face 81B arranged to face in opposite directions in the thickness direction z. The resistive element 81 includes a plurality of pieces of resistive element 10 of the resistor A10, connected to each other in the first direction x and the second direction y. The first face 81A corresponds to the first face 10A of the resistive element 10. The second face 81B corresponds to the second face 10B of the resistive element 10. The base material 82 includes a plurality of pieces of insulation plate 20 of the resistor A10, connected to each other in the first direction x and the second direction y. First, a plurality of slits 811 are formed in the resistive element 81, so as to penetrate therethrough from the first face 10A to the second face 81B. The plurality of slits 811 correspond to the plurality of slits 11 of the resistor A10. The plurality of slits 811 are formed through a wet etching process. Then the base material 82 is thermally press-bonded to the first face 81A, by an accumulation press method. When the base material 82 is press-bonded to the first face 81A, a part of the base material 82 intrudes into the plurality of slits 811, in the thickness direction z. Then a plurality of grooves 812 are formed in the resistive element 81, so as to recede from the second face 10B, with a probe for measuring the resistance value of the resistive element 81 kept in contact with the second face 10B. The plurality of grooves 812 correspond to the plurality of grooves 12 of the resistor A10. The plurality of grooves 12 may be formed, for example, by laser irradiation. When the resistance value of the resistive element 81 reaches a predetermined value, the formation of the plurality of grooves 812 is finished.

Figure 12:
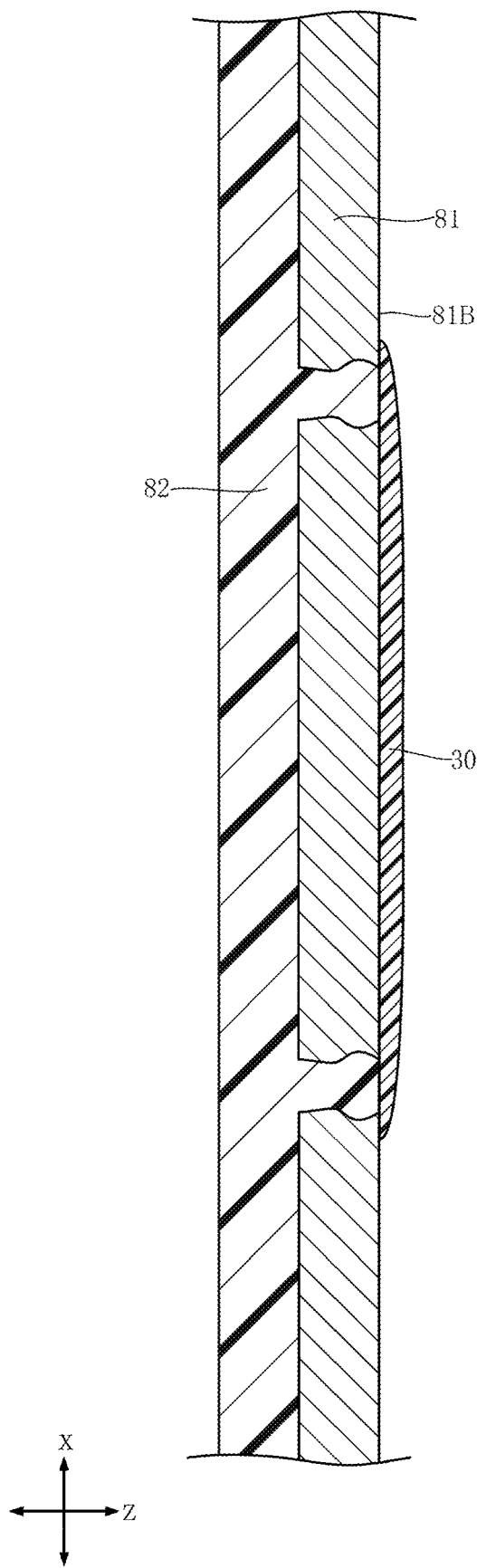
FIG. 12 is a cross-sectional view for explaining the manufacturing process of the resistor shown in FIG. 1.

Proceeding to FIG. 12, the protective film 30 is formed, so as to cover a part of each of the second face 81B of the resistive element 81, and of the surface of the base material 82 arranged to face in the same direction as the second face 81B. The protective film 30 may be formed through applying, by screen printing, a material containing an epoxy resin to the second face 81B, and the surface of the base material 82 arranged to face in the same direction as the second face 81B, and thermally curing the material.

Figure 13:
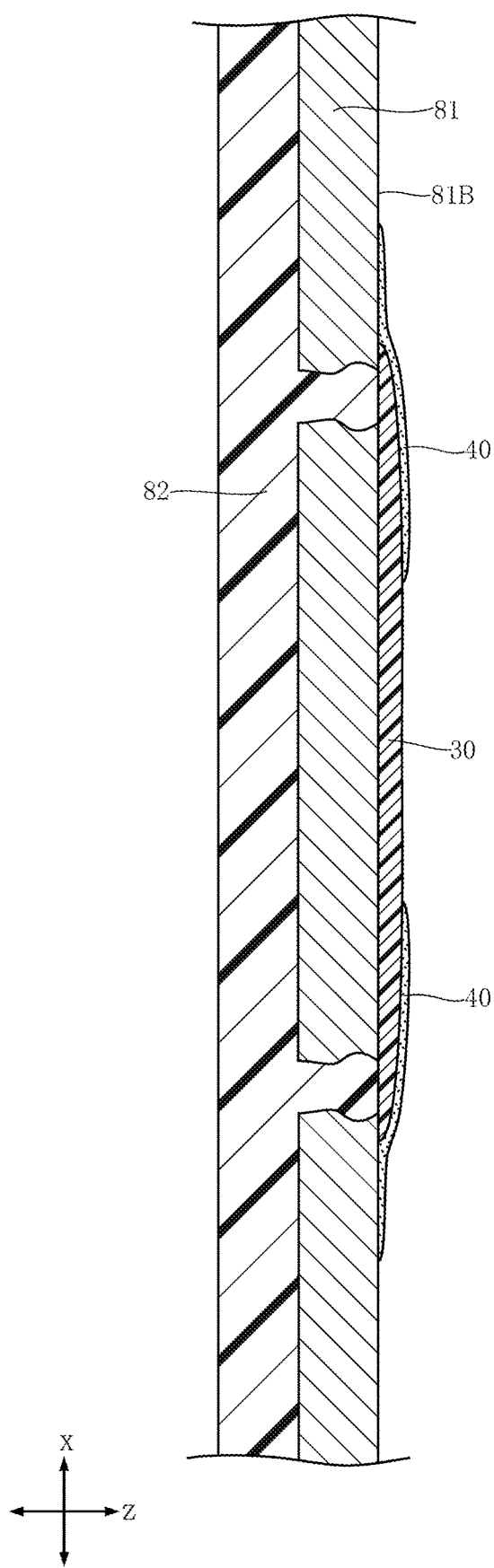
FIG. 13 is a cross-sectional view for explaining the manufacturing process of the resistor shown in FIG. 1.

Proceeding to FIG. 13, the pair of intermediate layers 40 are formed, so as to cover a part of each of the second face 81B of the resistive element 81, the surface of the base material 82 arranged to face in the same direction as the second face 81B, and the protective film 30. The pair of intermediate layers 40 may be formed through applying, by screen printing, a material containing silver particles and an epoxy resin to the second face 81B, the surface of the base material 82 arranged to face in the same direction as the second face 81B, and the protective film 30, and thermally curing the material.

Figure 14:
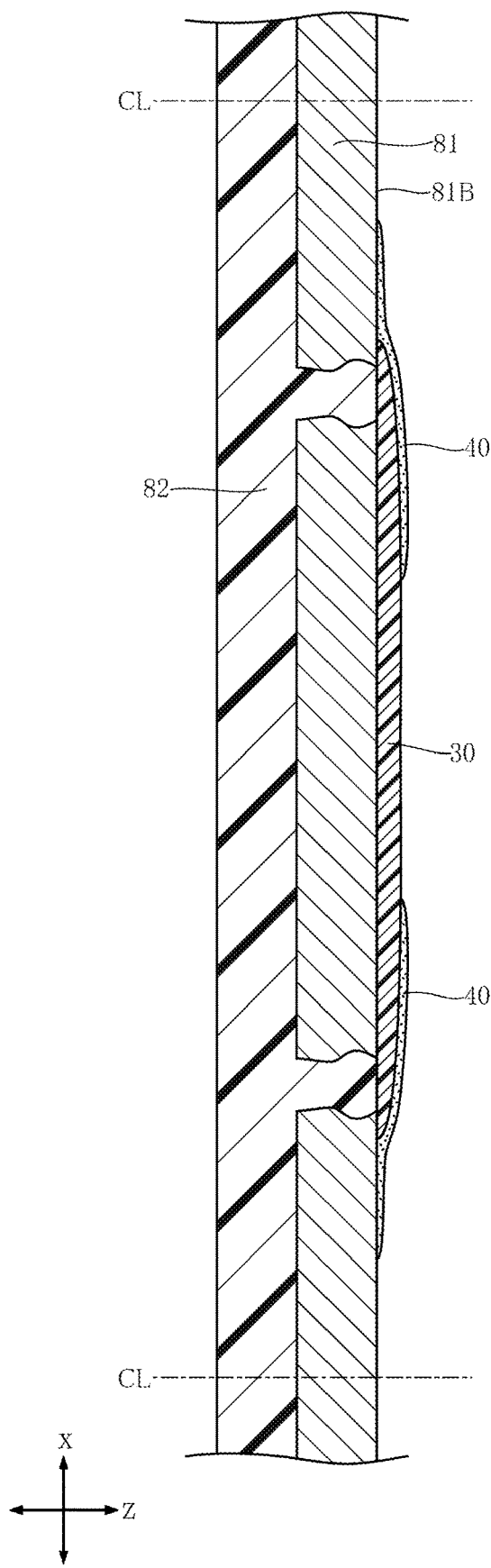
FIG. 14 is a cross-sectional view for explaining the manufacturing process of the resistor shown in FIG. 1.

Proceeding to FIG. 14, the resistive element 81 and the base material 82 are cut with a dicing blade along cutting lines CL, thus to be divided into individual pieces each including the protective film 30 and the pair of intermediate layers 40. Such individual pieces each constitute the element of the resistor A10, except the pair of electrodes 50. In other words, the resistive element 81 divided into the individual piece corresponds to the resistive element 10 of the resistor A10. Likewise, the base material 82 divided into the individual piece corresponds to the insulation plate 20 of the resistor A10. The pair of first end faces 10C of the resistive element 10, and the pair of second end faces 20A of the insulation plate 20 correspond to the cut section of the resistive element 81 and the base material 82, resultant from the mentioned cutting process.

Figure 15:
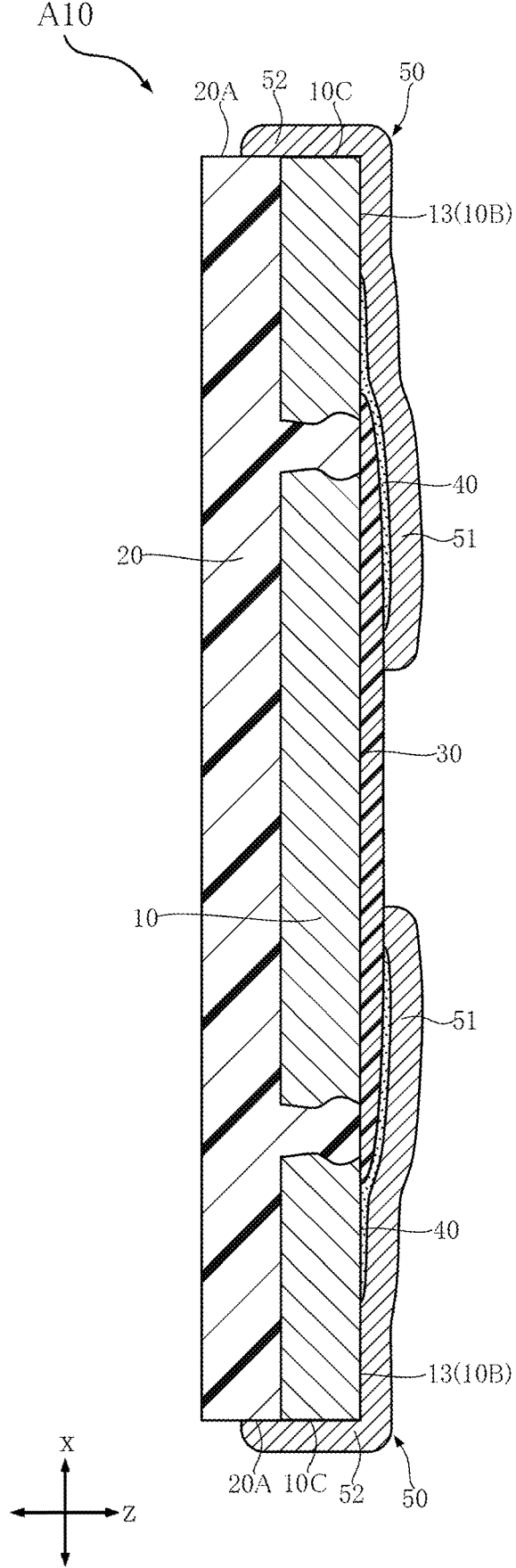
FIG. 15 is a cross-sectional view for explaining the manufacturing process of the resistor shown in FIG. 1.

Finally, as shown in FIG. 15, the pair of electrodes 50 are formed, in contact with the resistive element 10. The pair of electrodes 50 may be formed by sequentially depositing the copper layer, the nickel layer, and the tin layer, by electrolytic barrel plating. The pair of intermediate layers 40 are each covered with the bottom portion 51 of one of the pair of electrodes 50. The bottom portion 51 of each of the pair of electrodes 50 is in contact with the exposed region 13 of the second face 10B of the resistive element 10, and the protective film 30. Further, each of the pair of first end faces 10C of the resistive element 10, and a part of each of the pair of second end faces 20A of the insulation plate 20 are covered with the lateral portion 52 of one of the pair of electrodes 50. Thereafter, the pair of electrodes 50 are subjected to heat treatment, for two hours under the temperature of 170° C. As result, the adhesion strength between the bottom portion 51 of the pair of electrodes 50 and the resistive element 10 is improved. Throughout the foregoing process, the resistor A10 can be obtained.

The resistor A10 provides the following advantageous effects.

In the resistor A10, the respective bottom portions 51 of the pair of electrodes 50 overlap with a part of the protective film 30, as viewed in the thickness direction z. The resistor A10 includes the pair of intermediate layers 40 spaced apart from each other in the first direction x, and each including the cover portion 41 covering a part of the protective film 30. The pair of intermediate layers 40 are formed of a material electrically conductive and containing a synthetic resin. The cover portion 41 of each of the pair of intermediate layers 40 is located between the protective film 30 and the bottom portion 51 of one of the pair of electrodes 50. Since the pair of electrodes 50 are formed by electrolytic barrel plating, as described with reference to the process of FIG. 15, sufficient adhesion strength can be attained between the bottom portion 51 of each of the pair of electrodes 50, and the cover portion 41 of one of the pair of intermediate layers 40. Further, the thermal stress generated at the interface between the bottom portion 51 of each of the pair of electrodes 50 and the cover portion 41 of one of the pair of intermediate layers 40, during the use of the resistor A10, can be mitigated by the cover portion 41. Accordingly, the thermal stress transmitted to the interface between the cover portion 41 of each of the pair of intermediate layers 40 and the protective film 30 is reduced. Therefore, the cover portion 41 of the pair of intermediate layers 40 can be prevented from being separated from the protective film 30 owing to the impact of the thermal stress. With the resistor A10, consequently, the portion of the pair of electrodes 50 overlapping with the protective film 30, as viewed in the thickness direction z (i.e., bottom portion 51), can be prevented from being separated.

The protective film 30 is formed of a material containing a synthetic resin. Accordingly, the protective film 30 and the pair of intermediate layers 40 are both formed of the same type of material, which leads to improved adhesion strength between the protective film 30 and the cover portion 41 of the pair of intermediate layers 40.

The pair of intermediate layers 40 each contain metal particles. Accordingly, electrical conduction can be secured, despite the pair of intermediate layers 40 being formed of a material containing a synthetic resin. Further, the metal particles include silver. Whereas the pair of electrodes 50 formed by electrolytic barrel plating is subjected to the heat treatment under a predetermined condition, as described with reference to the process of FIG. 15, the silver is relatively unsusceptible to thermal oxidation. Therefore, the adhesion strength between the bottom portion 51 of each of the pair of electrodes 50, and one of the pair of intermediate layers 40, can be improved.

The pair of intermediate layers 40 are higher in electrical resistivity, than the resistive element 10. Accordingly, the current flowing in the resistive element 10 is impeded from flowing in the pair of intermediate layers 40, during the use of the resistor A10. Therefore, fluctuation in resistance value of the resistor A10, arising from the influence of the pair of intermediate layers 40, can be suppressed.

The protective film 30 contains the filler 31, formed of a material containing a ceramic. Accordingly, the mechanical strength of the protective film 30 can be increased. Further, selecting the ceramic having relatively high thermal conductivity, such as alumina or boron, results in improved thermal conductivity of the protective film 30. Such an arrangement leads to further improvement in heat dissipation performance of the resistor A10.

The insulation plate 20 is formed of a material containing a synthetic resin. Accordingly, the base material 82 can be thermally press-bonded to the first face 81A of the resistive element 81 by accumulation press, in the process shown in FIG. 11. In addition, the resistive element 10 includes the plurality of slits 11, penetrating therethrough from the first face 10A to the second face 10B. A part of the insulation plate 20 is filled in the plurality of slits 11, in the thickness direction z. Therefore, the insulation plate 20 can exert an anchor effect on the resistive element 10, thereby improving the adhesion strength between the resistive element 10 and the insulation plate 20. Further, the plurality of slits 11 each include the pair of sidewalls 111, spaced apart from each other in the first direction x. The pair of sidewalls 111 each include the concave portion recessed in the first direction x. Such a configuration enhances the anchor effect of the insulation plate 20 with respect to the resistive element 10, thereby further improving the adhesion strength between the resistive element 10 and the insulation plate 20.

The resistive element 10 includes the plurality of grooves 12, recessed from the second face 10B and extending in the predetermined direction. The protective film 30 is meshed with the plurality of grooves 12. Accordingly, the protective film 30 can exert an anchor effect on the resistive element 10, thereby improving the adhesion strength between the resistive element 10 and the protective film 30.

The insulation plate 20 includes the pair of second end faces 20A, arranged to face in opposite directions to each other in the first direction x, and spaced apart from each other in the first direction x. The lateral portion 52 of each of the pair of electrodes 50 is in contact with one of the pair of second end faces 20A. Such a configuration allows the size of the lateral portion 52 of the pair of electrodes 50 in the thickness direction z to be increased. When the resistor A10 is mounted on a circuit board, a solder fillet is formed on the lateral portion 52 of each of the pair of electrodes 50. Therefore, the mentioned configuration also leads to an increase in volume of the solder fillet, thereby further improving the mounting strength of the resistor A10, with respect to the circuit board.

The protective film 30 is located on the inner side in the first direction x, with respect to the pair of first end faces 10C of the resistive element 10, as viewed in the thickness direction z. The bottom portion 51 of each of the pair of electrodes 50 is in contact with the exposed region 13 of the second face 10B of the resistive element 10, located between one of the pair of first end faces 10C and the protective film 30, as viewed in the thickness direction z. Such a configuration facilitates the current flowing in the resistive element 10 to flow from the exposed region 13 to the bottom portion 51 of the pair of electrodes 50, during the use of the resistor A10. Therefore, the length of the current path in the resistor A10 is shortened, by which fluctuation in resistance value of the resistor A10, arising from the influence of the pair of electrodes 50, can be suppressed.

The extended portion 42 of each of the pair of intermediate layers 40 includes the recess 421, receding in the first direction x from one of the pair of first end faces 10C of the resistive element 10. From the recess 421, the exposed region 13 of the second face 10B of the resistive element 10 is exposed. The bottom portion 51 of each of the pair of electrodes 50 is in contact with both of the exposed region 13 and the extended portion 42 of one of the pair of intermediate layers 40. Therefore, the contact area between each of the pair of intermediate layers 40 and the bottom portion 51 of one of the pair of electrodes 50 can be increased, without incurring the fluctuation in resistance value of the resistor A10.

Second Embodiment

Figure 16:
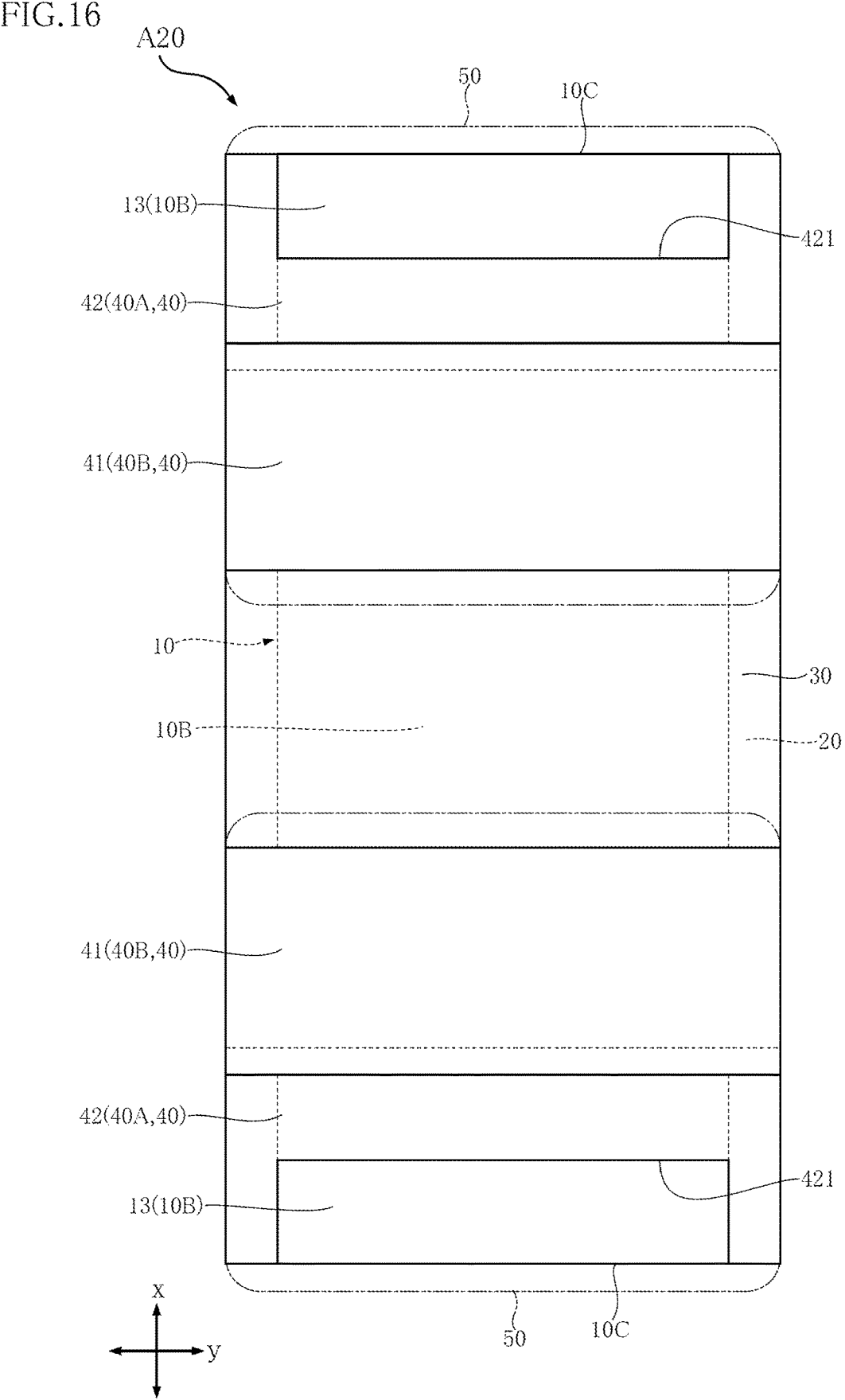
FIG. 16 is a bottom view showing a resistor according to a second embodiment of the present disclosure, seen through the pair of electrodes.
Figure 17:
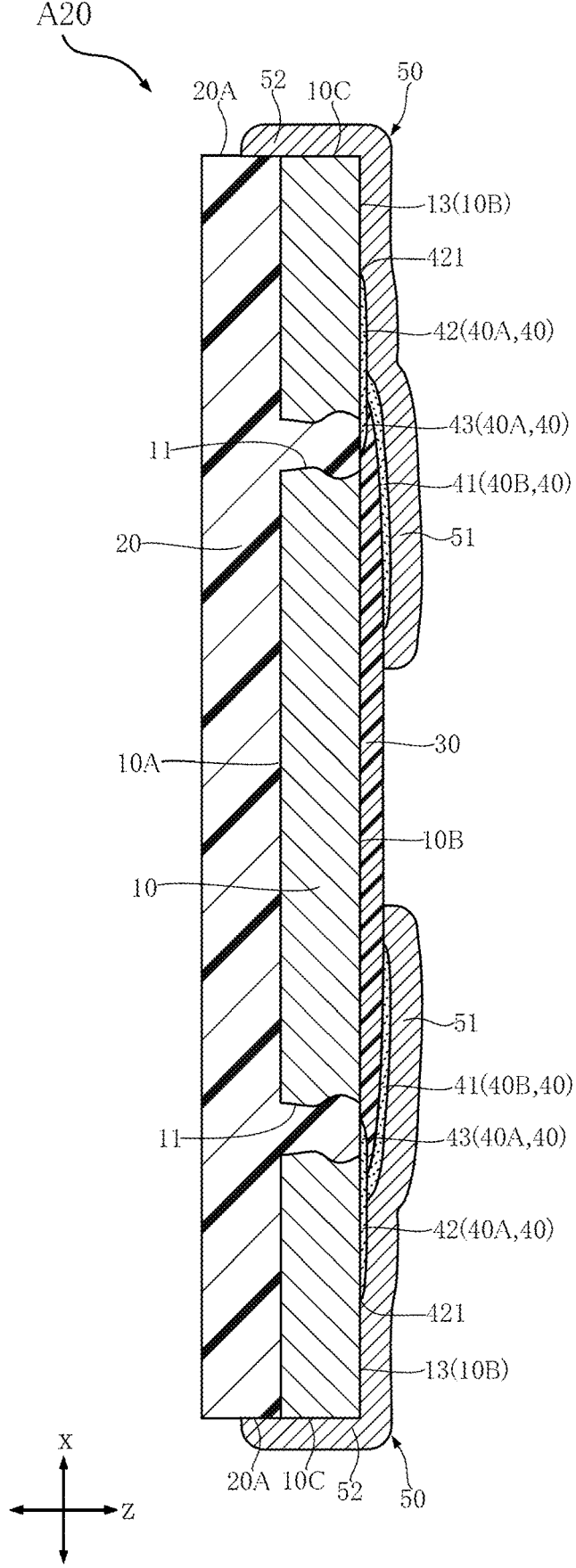
FIG. 17 is a cross-sectional view of the resistor shown in FIG. 16.
Figure 18:
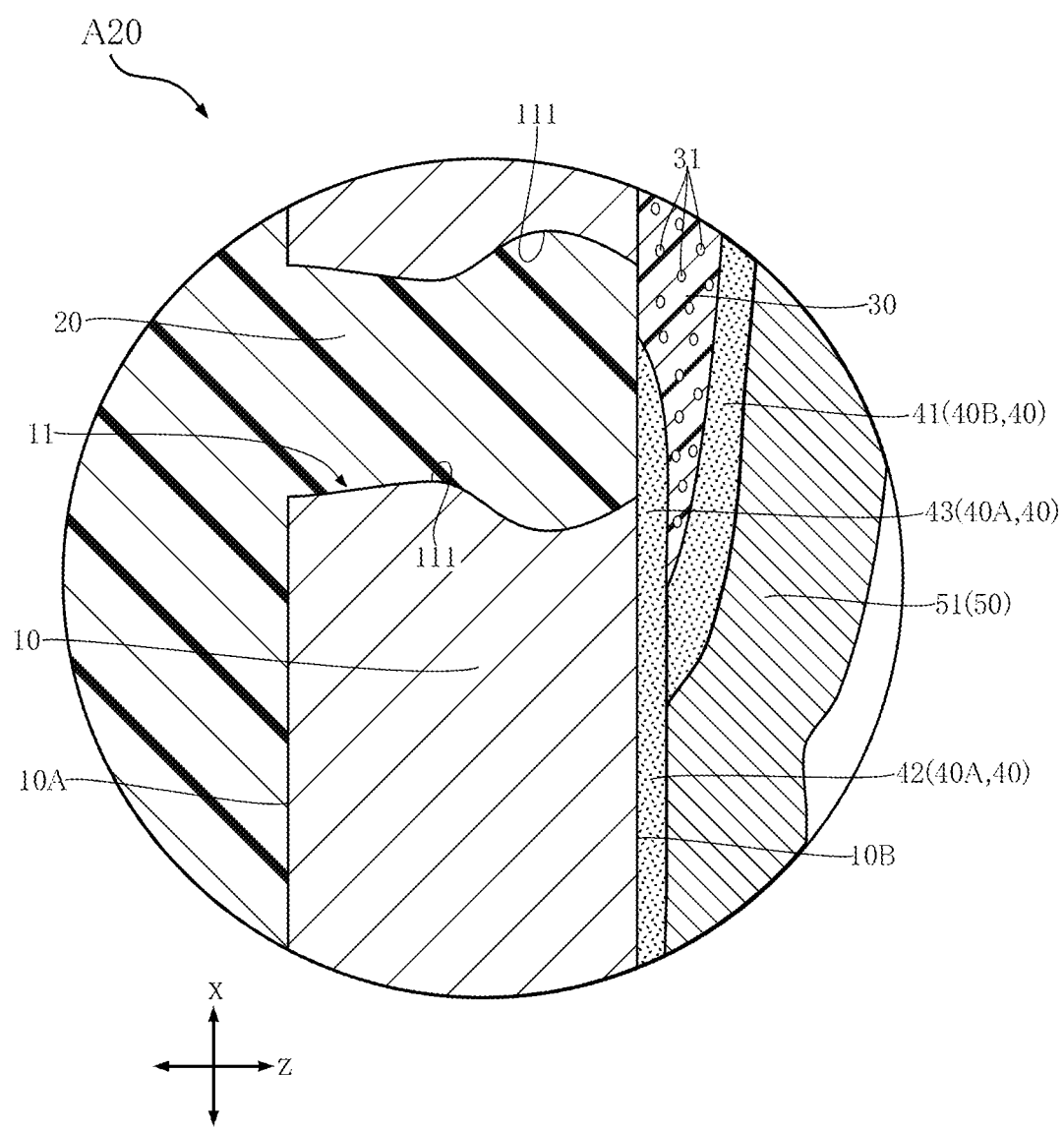
FIG. 18 is a partially enlarged cross-sectional view from FIG. 17.

Referring now to FIG. 16 to FIG. 18, a resistor A20 according to a second embodiment of the present disclosure will be described hereunder. In these drawings, the elements same as or similar to those of the resistor A10 are given the same numeral, and the description of such elements will not be repeated. Here, FIG. 16 illustrates the view seen through the pair of electrodes 50, for the sake of clarity. In FIG. 16, the pair of electrodes 50 seen through are indicated by imaginary lines. FIG. 17 represents the same cross-sectional position as FIG. 8.

The resistor A20 is different from the resistor A10, in the configuration of the protective film 30 and the pair of intermediate layers 40.

As shown in FIG. 16 and FIG. 17, the pair of intermediate layers 40 each include a first layer 40A and a second layer 40B. The first layer 40A includes the extended portion 42, and is in contact with both of the second face 10B of the resistive element 10 and the face of the insulation plate 20 arranged to face in the same direction as the second face 10B. The size of the first layer 40A in the thickness direction z is generally uniform over its entirety. The second layer 40B includes the cover portion 41. The second layer 40B is connected to the first layer 40A of one of the pair of intermediate layers 40. The second layer 40B is overlaid on a part of the first layer 40A.

As shown in FIG. 18, the first layer 40A of each of the pair of intermediate layers 40 includes an interposed portion 43 extending from the extended portion 42 toward the protective film 30. The interposed portion 43 includes a portion located between the resistive element 10 and the protective film 30. Accordingly, each of the end portions of the protective film 30 in the first direction x is overlaid on the first layer 40A of one of the pair of intermediate layers 40. In the resistor A20, the interposed portion 43 is in contact with both of the resistive element 10 and the protective film 30.

Figure 19:
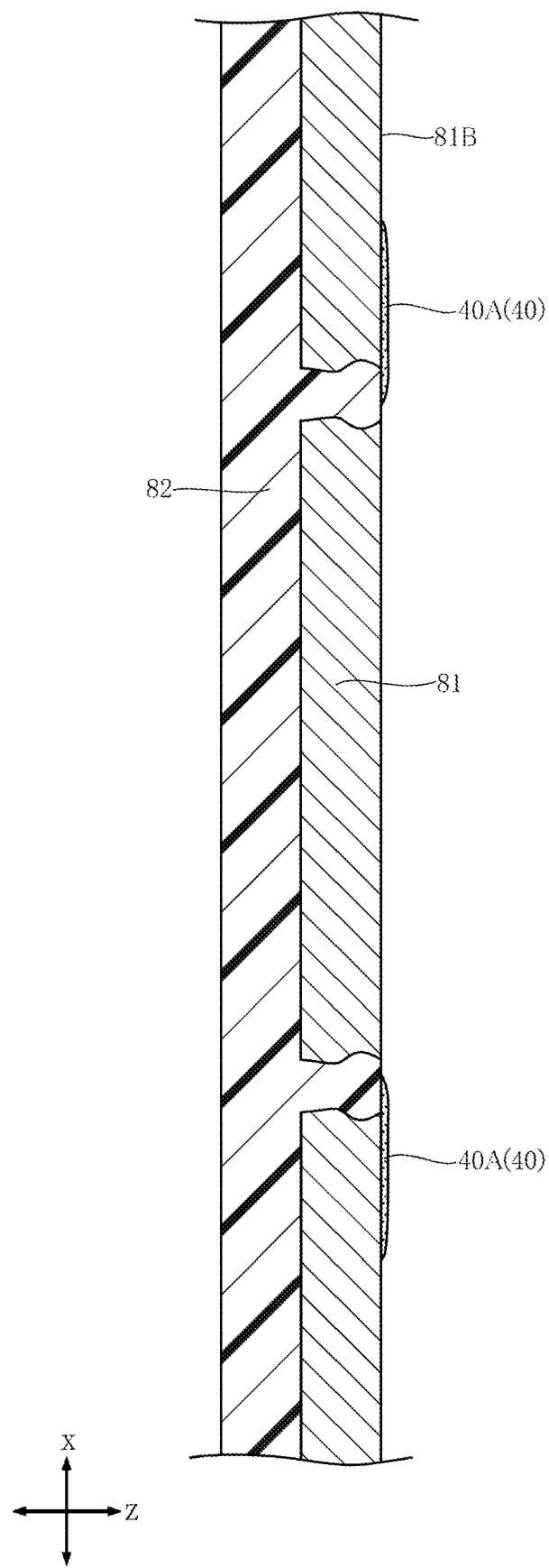
FIG. 19 is a cross-sectional view for explaining a manufacturing process of the resistor shown in FIG. 16.
Figure 20:
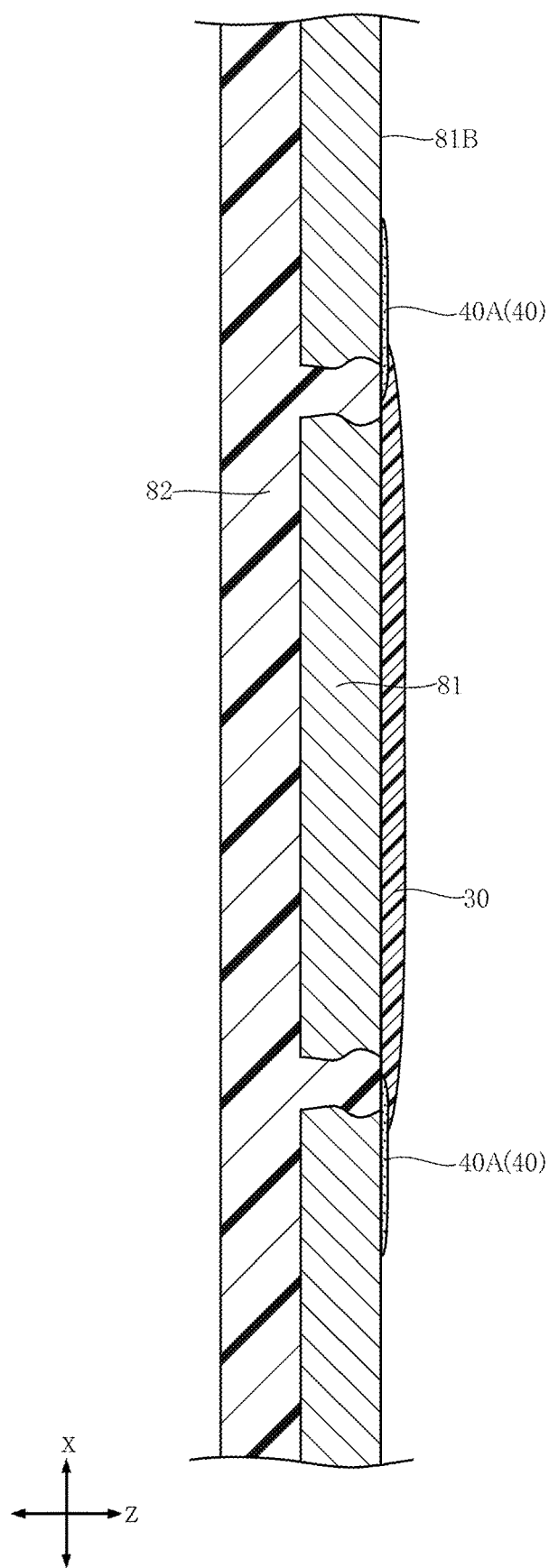
FIG. 20 is a cross-sectional view for explaining the manufacturing process of the resistor shown in FIG. 16.
Figure 21:
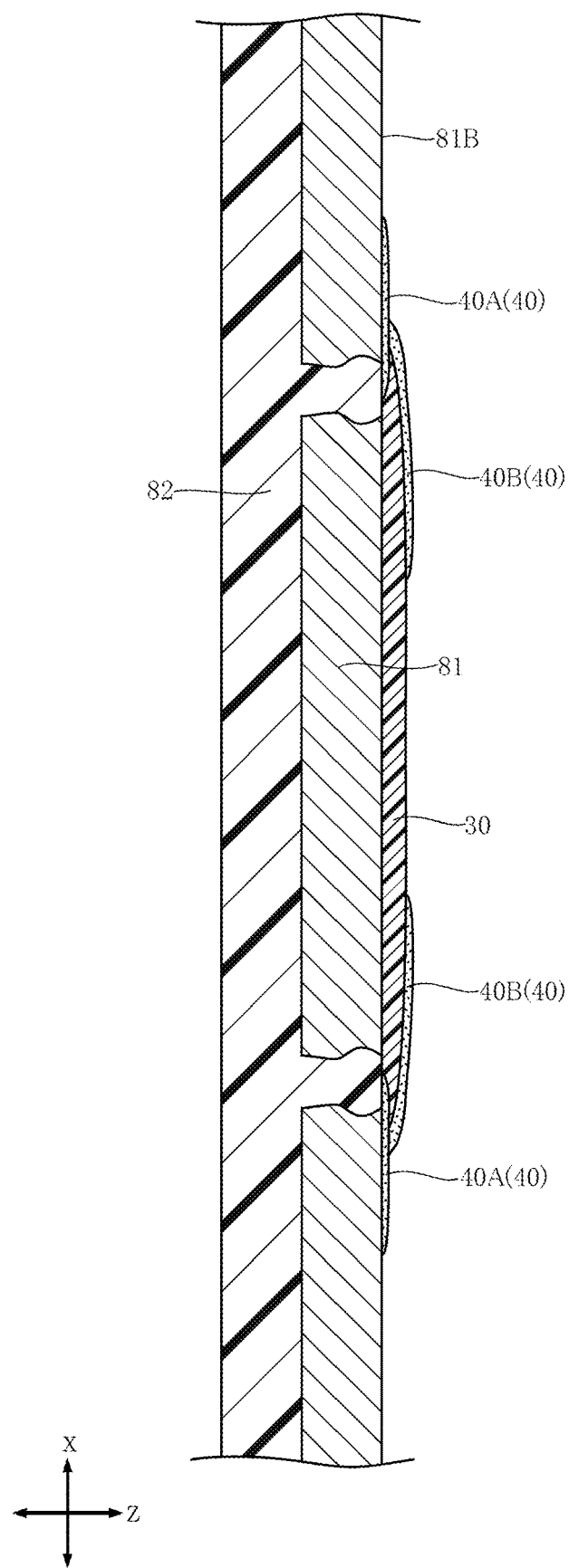
FIG. 21 is a cross-sectional view for explaining the manufacturing process of the resistor shown in FIG. 16.

Referring to FIG. 11, FIG. 14, FIG. 15, and FIG. 19 to FIG. 21, an exemplary manufacturing method of the resistor A20 will be described hereunder. Here, FIG. 19 to FIG. 21 represent the same cross-sectional position as FIG. 17.

Referring first to FIG. 11, the base material 82 is thermally press-bonded to the resistive element 81, having the first face 81A and the second face 81B arranged to face in opposite directions in the thickness direction z. Since this process is the same as the process in the manufacturing method of the resistor A10, further description will be skipped.

Proceeding to FIG. 19, the first layer 40A of the pair of intermediate layers 40 is formed, so as to cover a part of each of the second face 81B of the resistive element 81, and the face of the base material 82 arranged to face in the same direction as the second face 81B. To form the first layer 40A of the pair of intermediate layers 40, a material containing silver particles and an epoxy resin is applied, by screen printing, to both of the second face 81B and the face of the base material 82 arranged to face in the same direction as the second face 81B. Such material is applied to positions spaced apart from each other in the first direction x. Then upon thermally curing the material, the first layer 40A of the pair of intermediate layers 40 can be obtained.

Proceeding to FIG. 20, the protective film 30 is formed, so as to cover a part of each of the second face 81B of the resistive element 81, and the face of the base material 82 arranged to face in the same direction as the second face 81B. First, a material containing an epoxy resin is applied, by screen printing, to the second face 81B and the face of the base material 82 arranged to face in the same direction as the second face 81B. In this process, each of the end portions of the material in the first direction x is overlaid on a part of the first layer 40A of one of the pair of intermediate layers 40. Then upon thermally curing the material, the protective film 30 can be obtained.

Proceeding to FIG. 21, the second layer 40B of the pair of intermediate layers 40 is formed, so as to cover a part of the protective film 30. First, a material containing silver particles and an epoxy resin is applied, by screen printing, to the protective film 30. The material is applied to positions spaced apart from each other in the first direction x. In addition, each of the materials applied to the positions spaced apart from each other is laid over a part of the first layer 40A of one of the pair of intermediate layers 40. Then upon thermally curing the material, the second layer 40B of the pair of intermediate layers 40 can be obtained.

Returning to FIG. 14, the resistive element 81 and the base material 82 are cut with a dicing blade along the cutting lines CL, thus to be divided into individual pieces each including the protective film 30 and the pair of intermediate layers 40 (first layer 40A and second layer 40B). Since this process is the same as the process in the manufacturing method of the resistor A10, further description will be skipped.

Finally, as shown in FIG. 15, the pair of electrodes 50 are formed, in contact with the resistive element 10. Since this process is the same as the process in the manufacturing method of the resistor A10, further description will be skipped. Throughout the foregoing process, the resistor A20 can be obtained.

The resistor A20 provides the following advantageous effects.

In the resistor A20, the bottom portion 51 of the pair of electrodes 50 overlaps with a part of the protective film 30, as viewed in the thickness direction z. The resistor A20 includes the pair of intermediate layers 40 spaced apart from each other in the first direction x, and each including the cover portion 41 covering a part of the protective film 30. The pair of intermediate layers 40 are formed of a material electrically conductive and containing a synthetic resin. The cover portion 41 of each of the pair of intermediate layers 40 is located between the protective film 30 and the bottom portion 51 of one of the pair of electrodes 50. With the resistor A20 also, therefore, the portion of the pair of electrodes 50 overlapping with the protective film 30, as viewed in the thickness direction z (i.e., bottom portion 51), can be prevented from being separated.

In the resistor A20, the pair of intermediate layers 40 each include the first layer 40A and the second layer 40B. The first layer 40A includes the extended portion 42. The second layer 40B includes the cover portion 41, and is connected to the first layer 40A of one of the pair of intermediate layers 40. Such a configuration allows the size of the first layer 40A of each of the pair of intermediate layers 40 in the thickness direction z to be generally uniform, over the entirety of the first layer 40A. In the resistor A20, the first layer 40A of the pair of intermediate layers 40 is in contact with the second face 10B of the resistive element 10. Therefore, making the size of the first layer 40A of the pair of intermediate layers 40 in the thickness direction z generally uniform further contributes to suppressing the fluctuation in resistance value of the resistor A20 arising from the influence of the pair of intermediate layers 40, compared with the case of the resistor A10.

The first layer 40A of each of the pair of intermediate layers 40 includes the interposed portion 43, extending from the extended portion 42 toward the protective film 30. The interposed portion 43 includes the portion located between the resistive element 10 and the protective film 30. Such a configuration results in an increase in contact area, between the protective film 30 and the pair of intermediate layers 40, thereby further increasing the adhesion strength between the protective film 30 and the pair of intermediate layers 40, compared with the case of the resistor A10.

Third Embodiment

Figure 22:
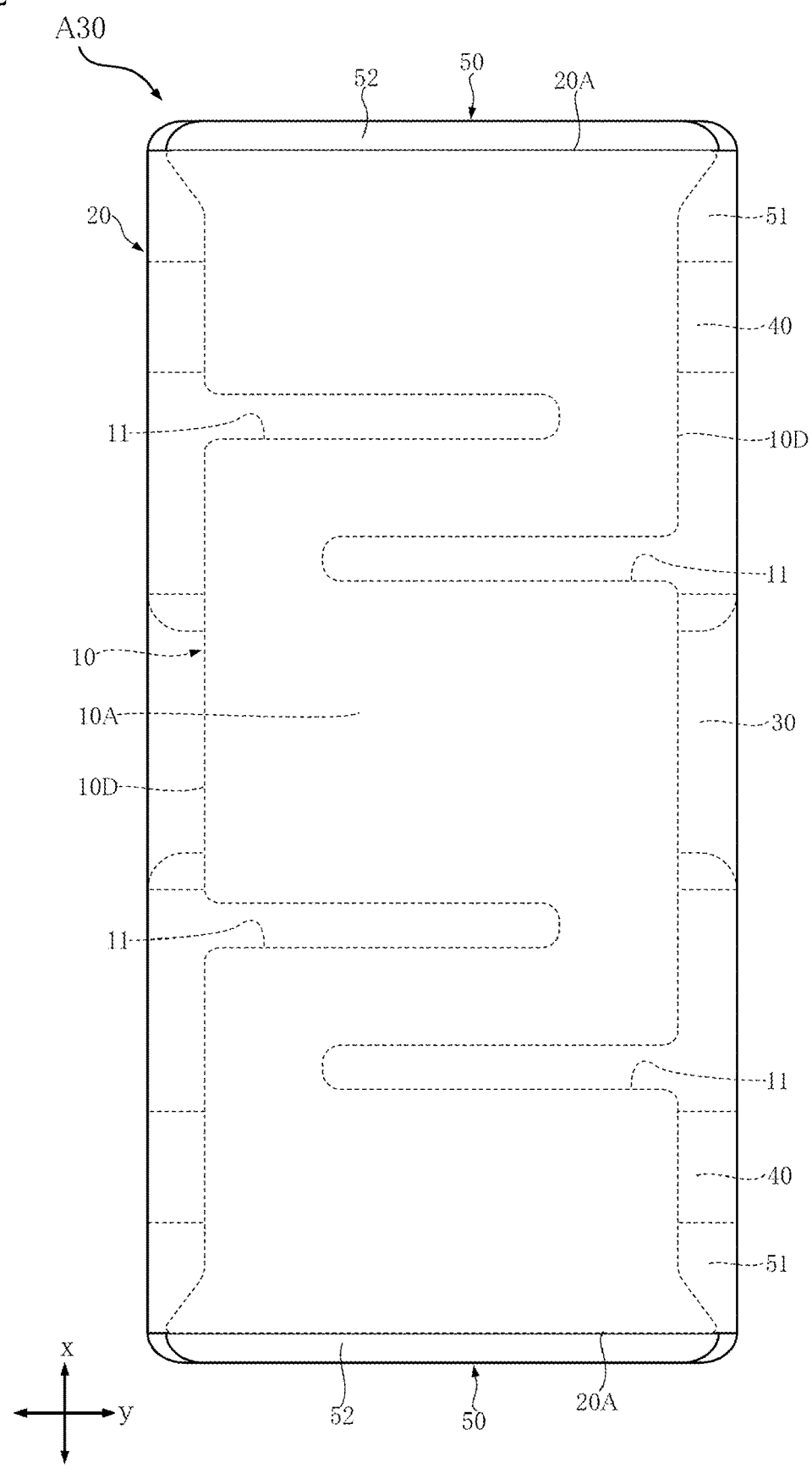
FIG. 22 is a plan view showing a resistor according to a third embodiment of the present disclosure.
Figure 23:
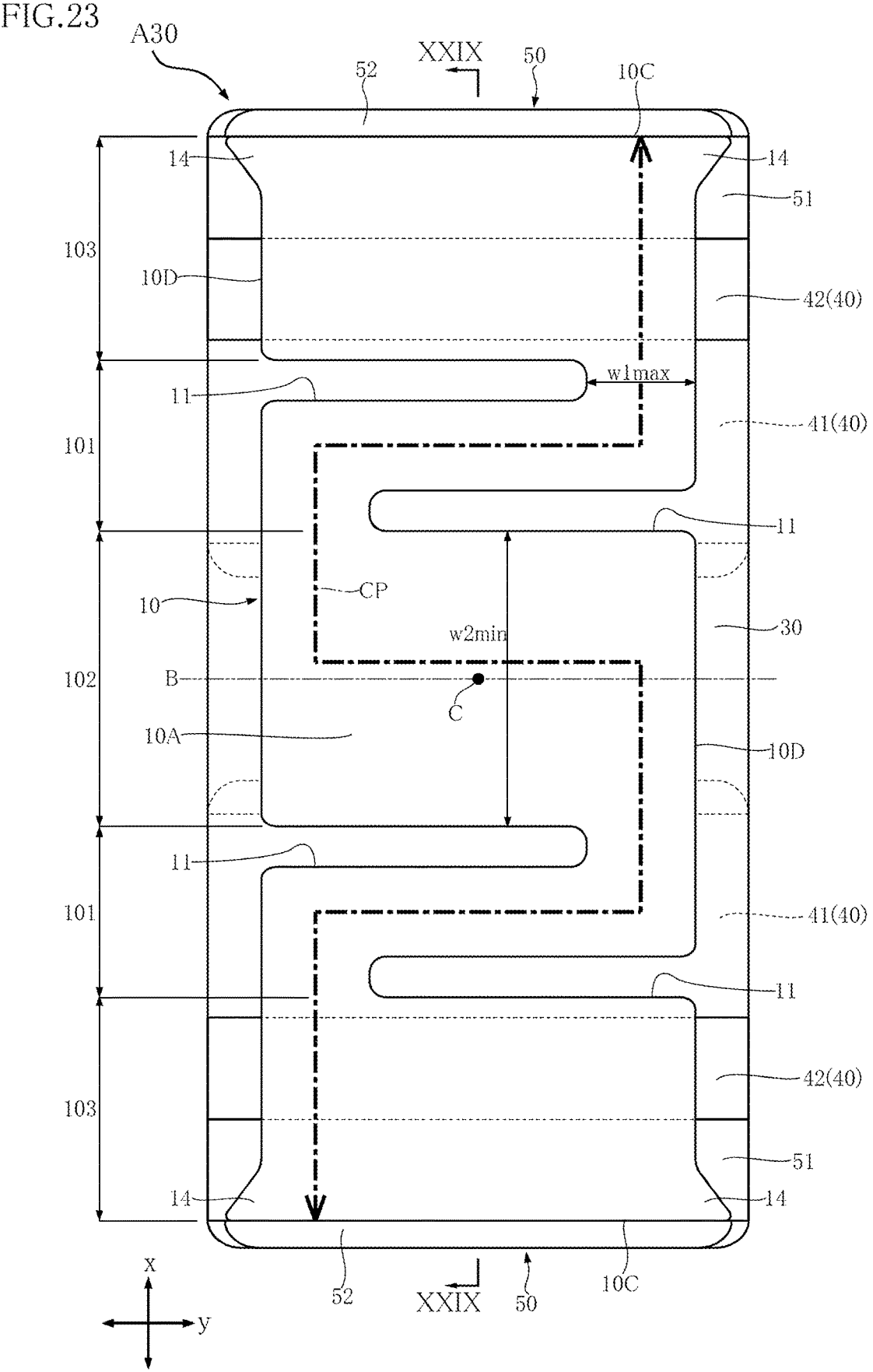
FIG. 23 is a plan view corresponding to FIG. 22, seen through the insulation plate.
Figure 24:
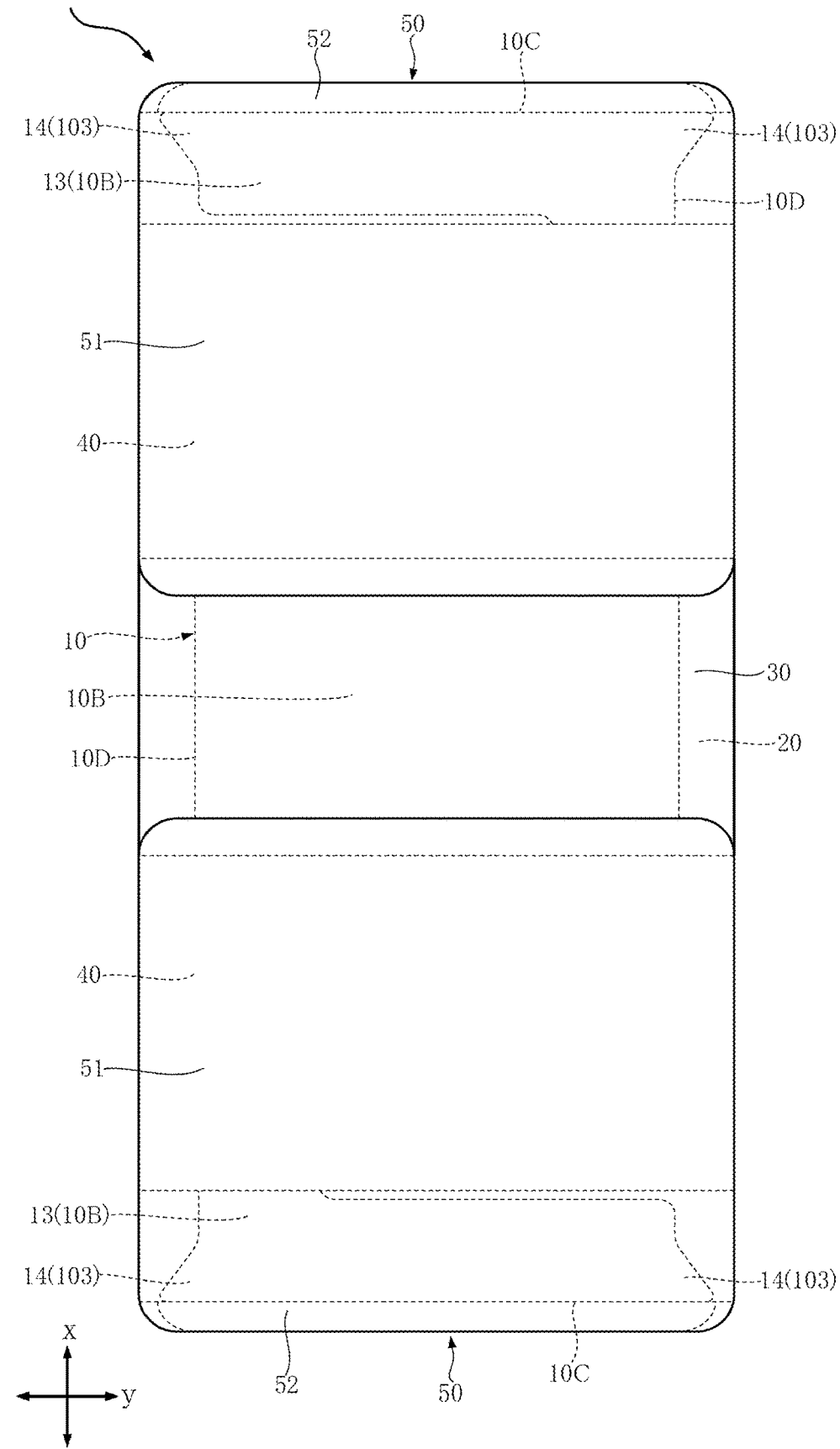
FIG. 24 is a bottom view of the resistor shown in FIG. 22.
Figure 25:
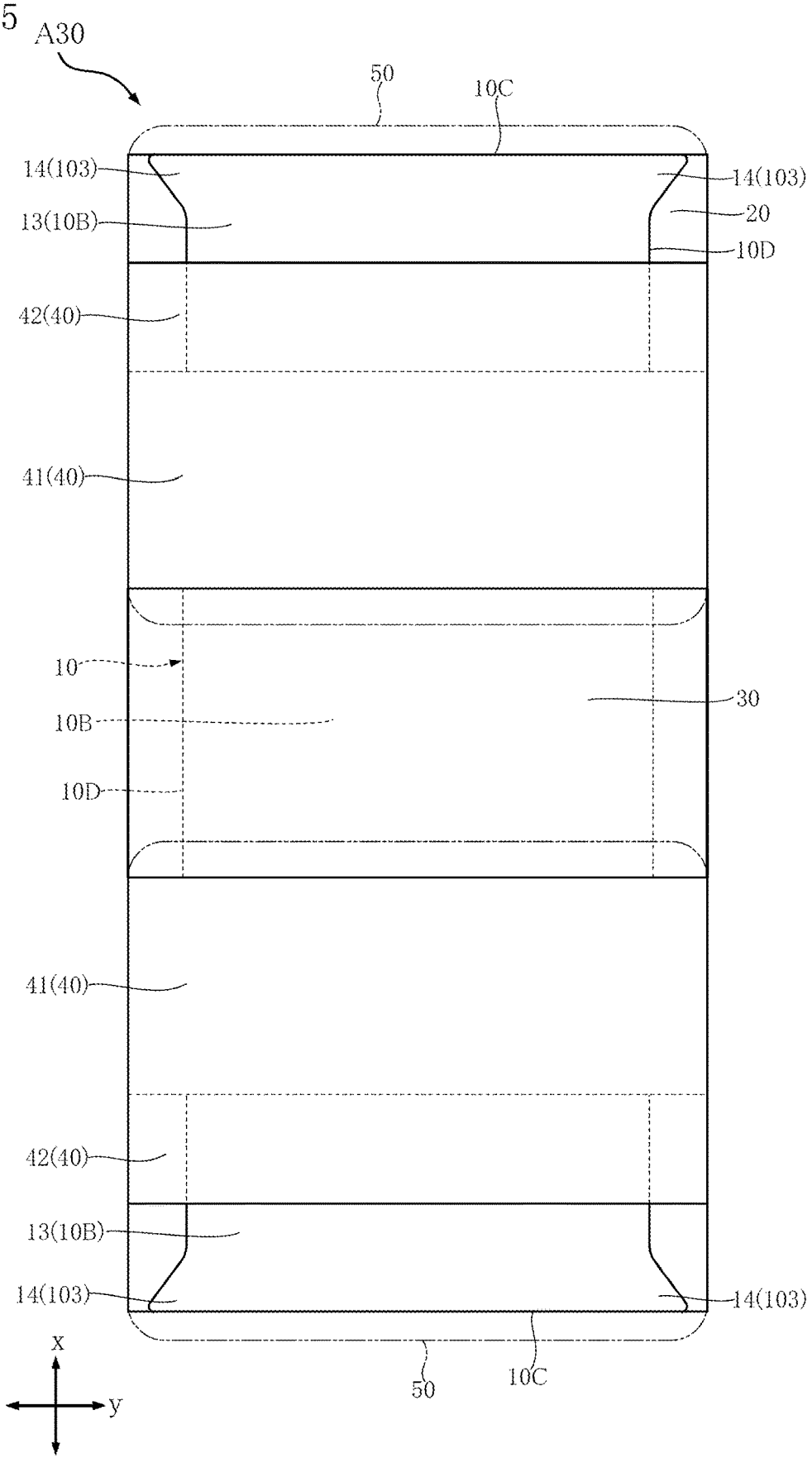
FIG. 25 is a bottom view corresponding to FIG. 24, seen through the pair of electrodes.
Figure 26:
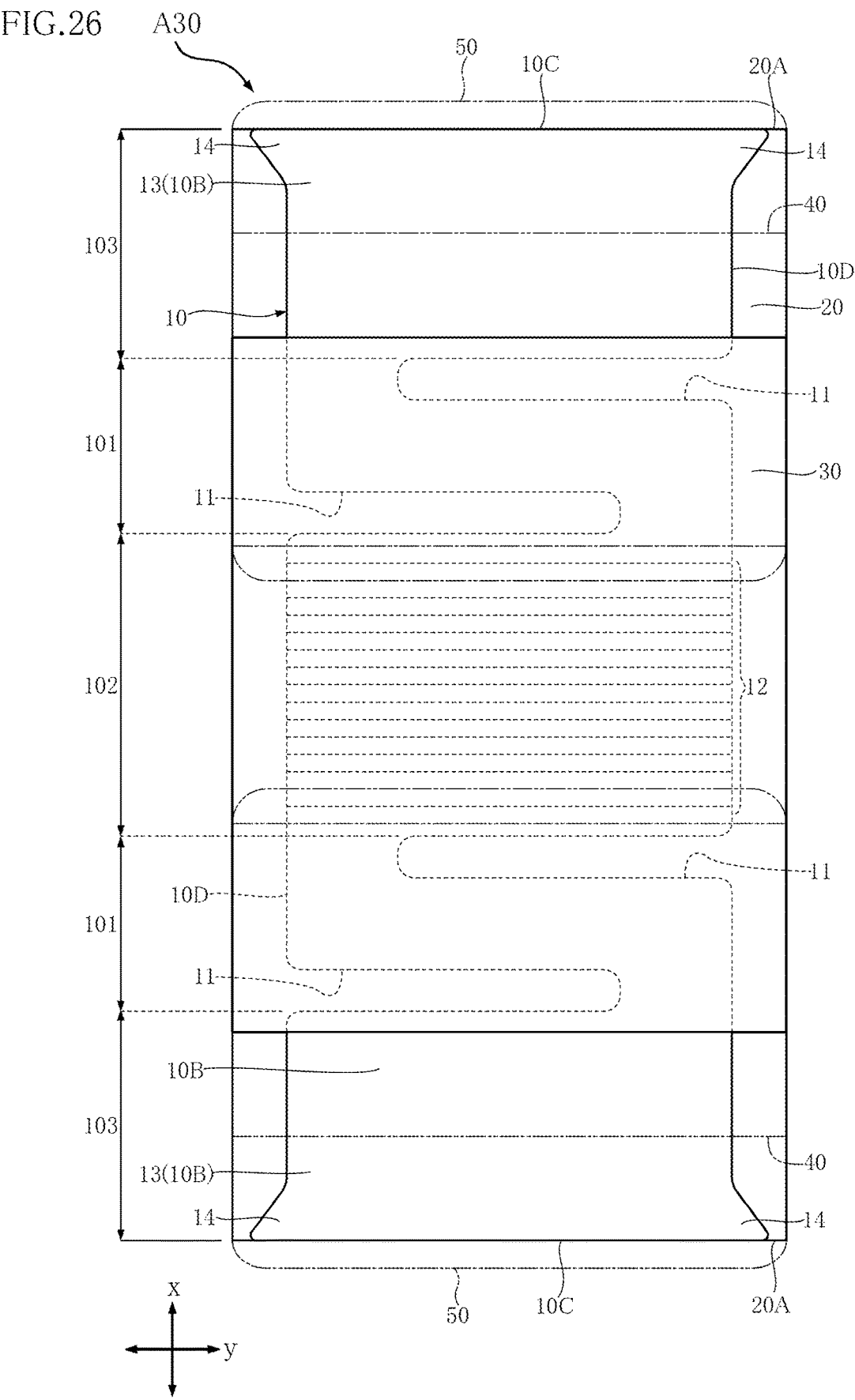
FIG. 26 is a bottom view corresponding to FIG. 24, seen through the pair of electrodes and the pair of intermediate layers.
Figure 27:
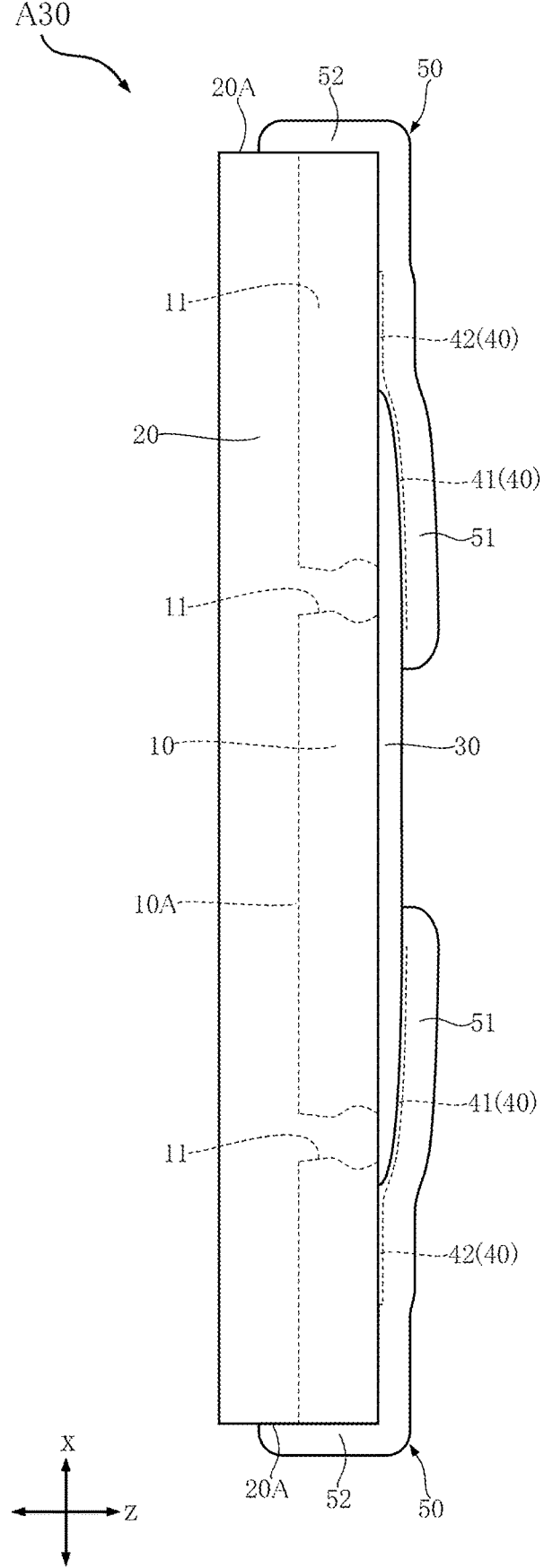
FIG. 27 is a right side view of the resistor shown in FIG. 22.

Referring now to FIG. 22 to FIG. 31, a resistor A30 according to a third embodiment of the present disclosure will be described hereunder. In these drawings, the elements same as or similar to those of the resistor A10 are given the same numeral, and the description of such elements will not be repeated. Here, FIG. 23 illustrates the view seen through the insulation plate 20, for the sake of clarity. FIG. 25 illustrates the view seen through the pair of electrodes 50, for the sake of clarity. FIG. 26 illustrates the view seen through the pair of intermediate layers 40, and the pair of electrodes 50, for the sake of clarity. In these drawings, the pair of intermediate layers 40 and the pair of electrodes 50 seen through, are indicated by imaginary lines.

Figure 29:
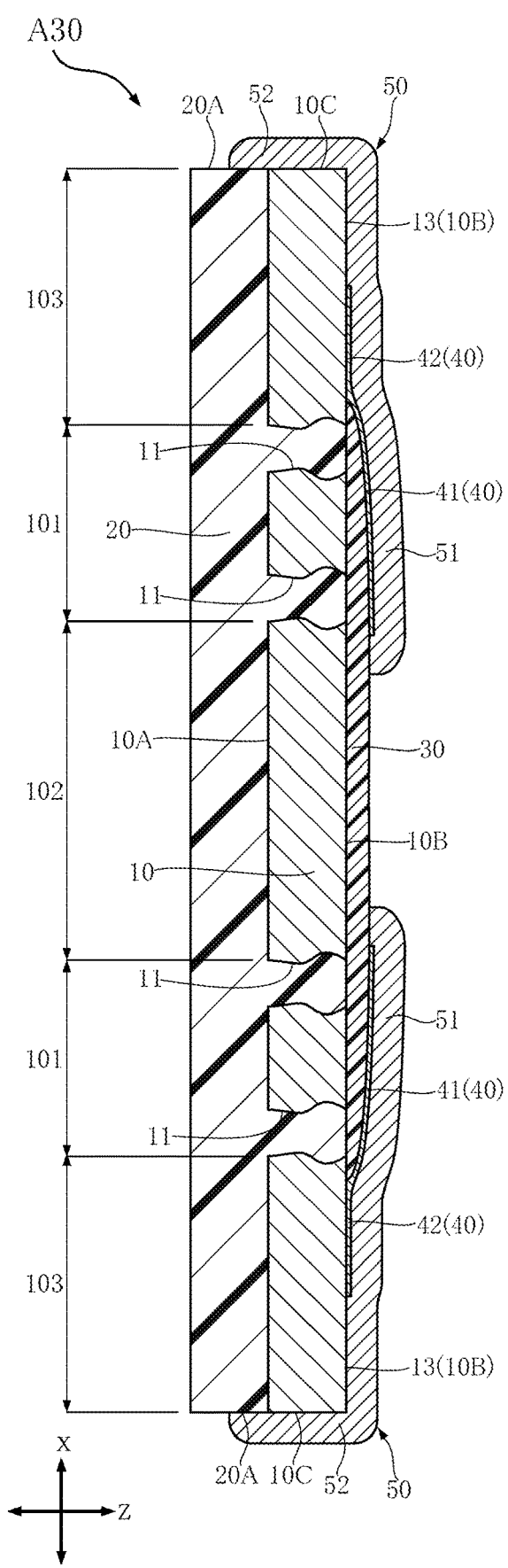
FIG. 29 is a cross-sectional view taken along a line XXIX-XXIX in FIG. 23.
Figure 30:
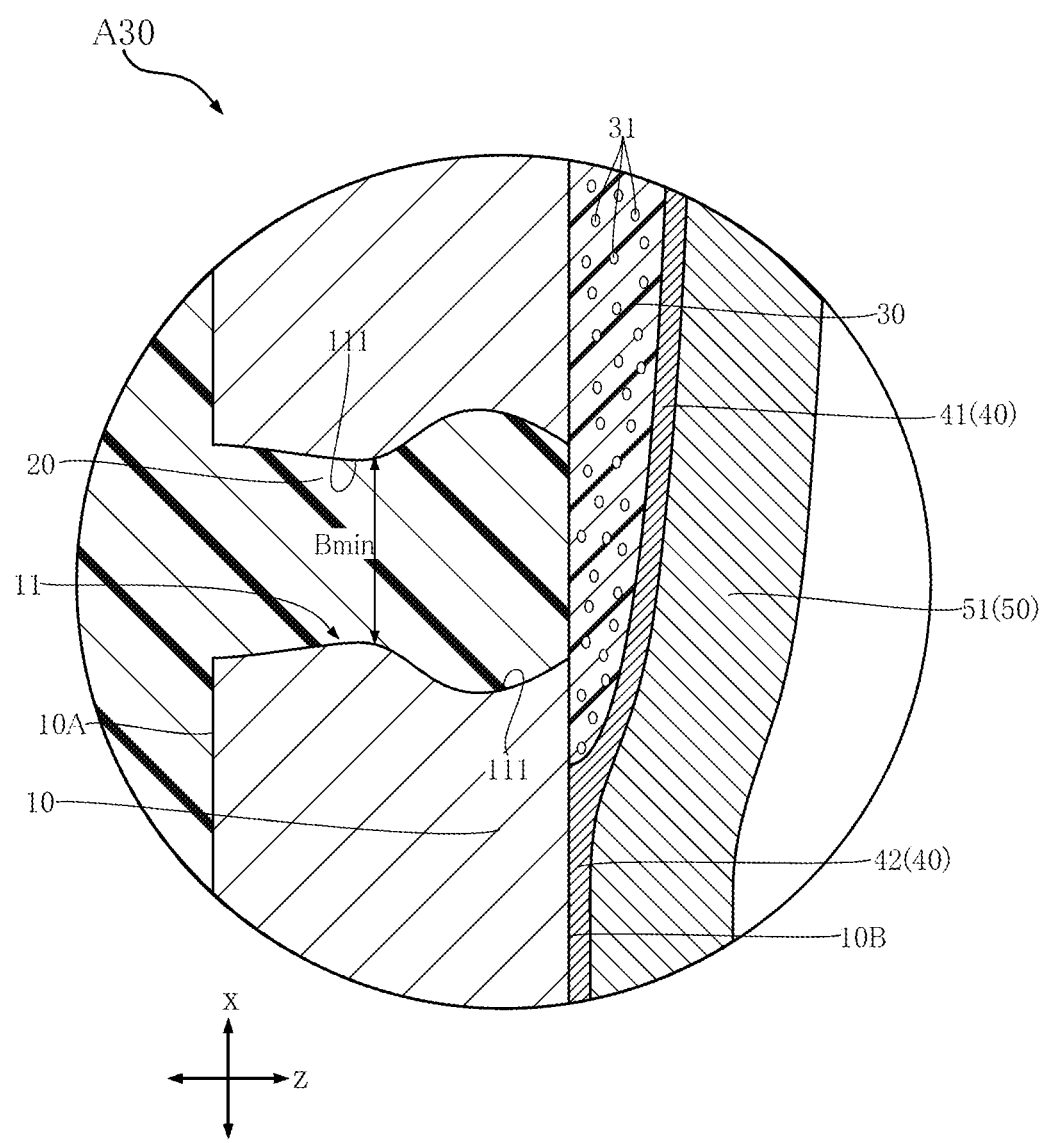
FIG. 30 is a partially enlarged cross-sectional view from FIG. 29.
Figure 31:
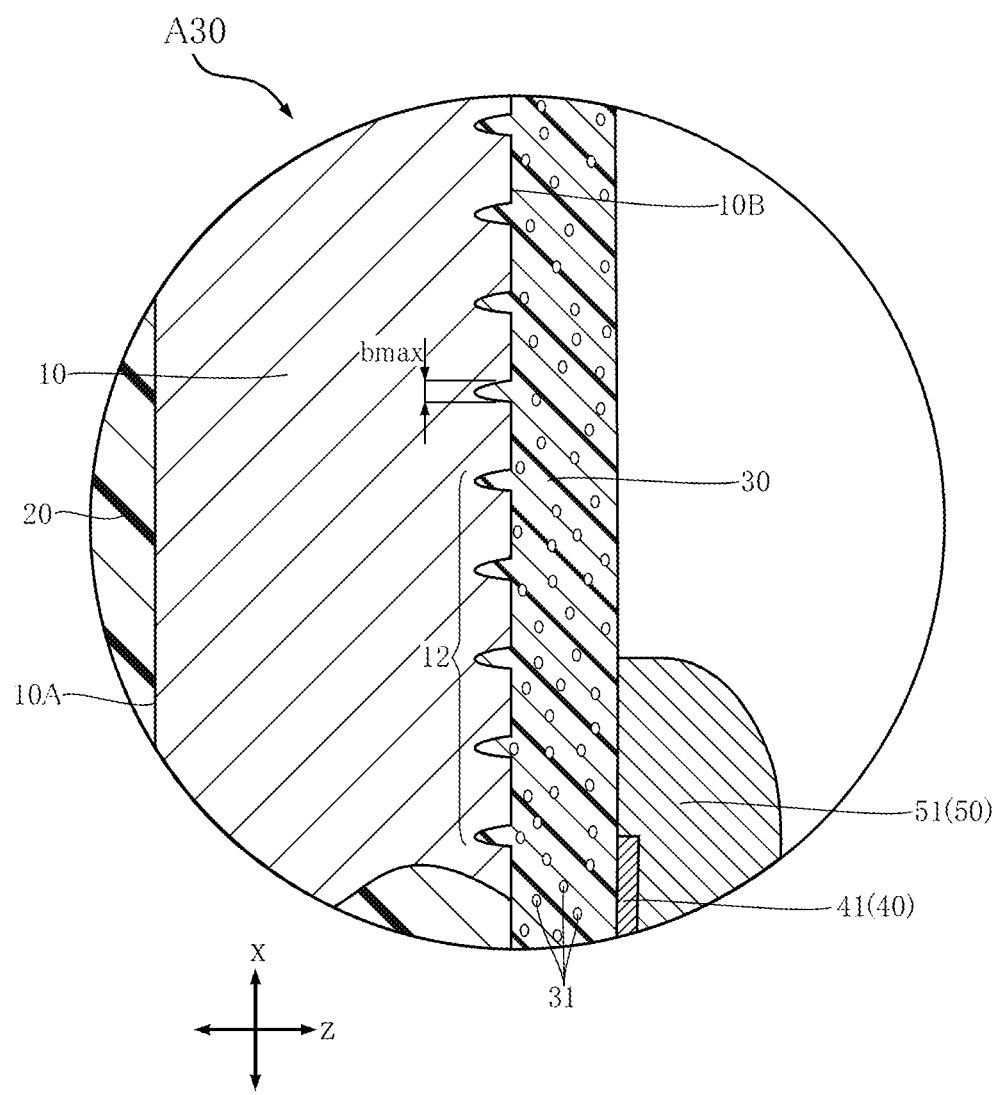
FIG. 31 is a partially enlarged cross-sectional view from FIG. 29.

In the resistor A30, as shown in FIG. 29, the resistive element 10 further includes a pair of side faces 10D, in addition to the first face 10A, the second face 10B, and the pair of first end faces 10C. The pair of side faces 10D are spaced apart from each other, in the second direction y. The pair of side faces 10D are each connected to both of the first face 10A and the second face 10B.

As shown in FIG. 23, FIG. 26 and FIG. 29, the resistive element 10 of the resistor A30 includes a pair of first resistive regions 101, a second resistive region 102, and a pair of connection regions 103. The pair of first resistive regions 101 are spaced apart from each other in the first direction x. The second resistive region 102 is located between the pair of first resistive regions 101. Each of the end portions of the second resistive region 102 in the first direction x is connected to one of the pair of first resistive regions 101. The pair of connection regions 103 are spaced apart from each other in the first direction x. The pair of connection regions 103 are each connected to one of the pair of first resistive regions 101. The pair of connection regions 103 are located at the outermost position of the resistive element 10, in the first direction x. The pair of connection regions 103 each include one of the pair of first end faces 10C.

As shown in FIG. 23, a maximum width w1max of a conduction path CP in each of the pair of first resistive regions 101 is narrower than a minimum width w2min of the conduction path CP in the second resistive region 102. Here, the conduction path CP represents the path of the current flowing in the resistive element 10, when a predetermined potential difference is applied to the pair of electrodes 50. The width of the conduction path CP refers to the size of the resistive element 10 taken perpendicularly to the conduction path CP, as viewed in the thickness direction z.

As shown in FIG. 23 and FIG. 26, the pair of side faces 10D each include an opening, at the position corresponding to one of the plurality of slits 11. The plurality of slits 11 are respectively formed in the pair of first resistive regions 101. The second resistive region 102 is located adjacent to one of the plurality of slits 11 farthest from one of the pair of electrodes 50, in the first direction x. In addition, the pair of connection regions 103 are each located adjacent to one of the plurality of slits 11 closest to one of the pair of electrodes 50, in the first direction x. The shape of the resistive element 10 including the plurality of slits 11 is point-symmetrical, as viewed in the thickness direction z. The term "point-symmetry" herein refers to the state where two portions of the resistive element 10, divided by a borderline B drawn in FIG. 23 in the second direction y so as to pass the center C of the resistive element 10, are point-symmetrical to each other, with respect to the center C.

As shown in FIG. 26, the plurality of grooves 12 are formed in the second resistive region 102. The plurality of grooves 12 may also be formed in the pair of first resistive regions 101, in addition to the second resistive region 102.

Figure 28:
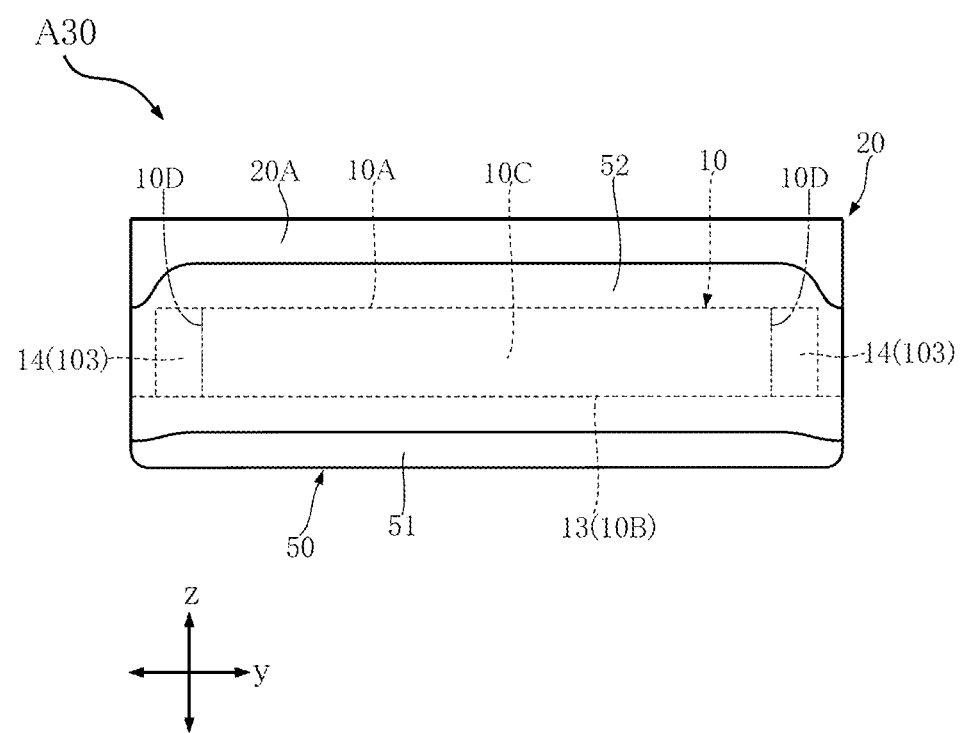
FIG. 28 is a front view of the resistor shown in FIG. 22.

As shown in FIG. 23, FIG. 25, and FIG. 28, the pair of connection regions 103 each include a pair of bulges 14. The pair of bulges 14 are spaced apart from each other in the second direction y. The pair of bulges 14 each protrude in the second direction y, from one of the pair of side faces 10D. The pair of bulges 14 are each connected to one of the pair of first end faces 10C.

As shown in FIG. 22 and FIG. 28, the first face 10A of the resistive element 10 and the pair of side faces 10D of the resistive element 10 are covered with the insulation plate 20.

In the resistor A30, the pair of intermediate layers 40 are formed of a metal thin film. The metal thin film is, for example, formed of a nickel—chrome (Cr) alloy.

In the resistor A30, as shown in FIG. 25, the exposed region 13 is located between one of the pair of first end faces 10C and the extended portion 42 of one of the pair of intermediate layers 40 closest to the one first end face 10C, as viewed in the thickness direction z.

As shown in FIG. 23 and FIG. 29, the pair of electrodes 50 are each located in contact with one of the pair of connection regions 103 of the resistive element 10. Accordingly, the pair of electrodes 50 are electrically connected to the resistive element 10.

As shown in FIG. 23 and FIG. 29, the pair of first resistive regions 101 of the resistive element 10 each overlap with the bottom portion 51 of one of the pair of electrodes 50, as viewed in the thickness direction z. The lateral portion 52 of each of the pair of electrodes 50 is in contact with one of the pair of first end faces 10C of the resistive element 10.

Referring to FIG. 32 to FIG. 37, an exemplary manufacturing method of the resistor A30 will be described hereunder. Here, FIG. 32 to FIG. 36 represent the same cross-sectional position as FIG. 29.

Figure 32:
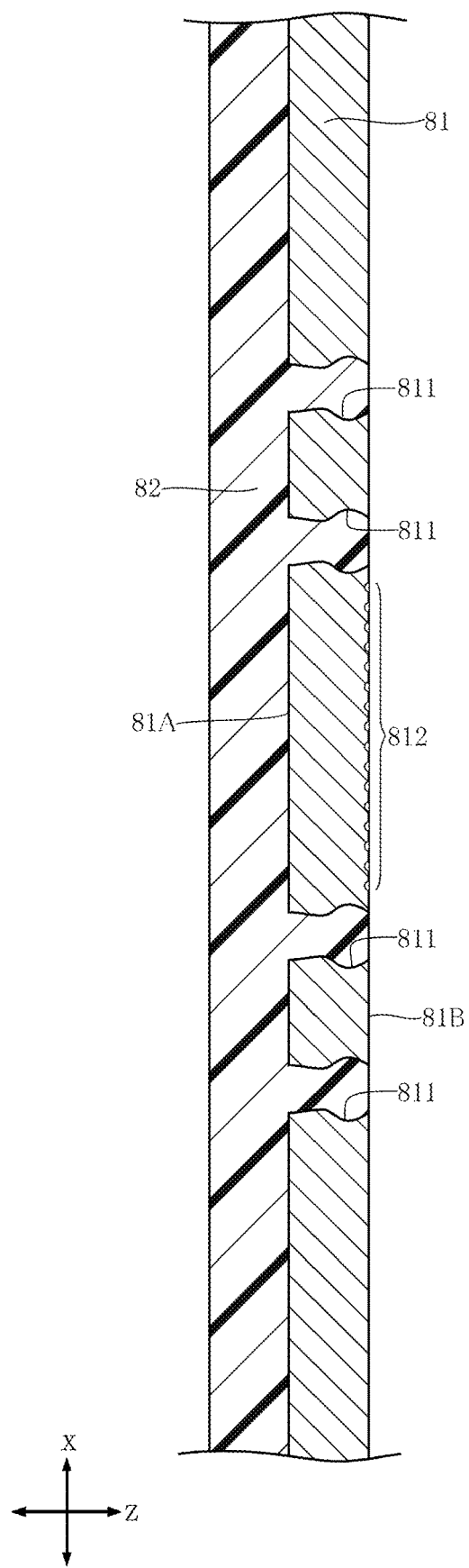
FIG. 32 is a cross-sectional view for explaining a manufacturing process of the resistor shown in FIG. 22.

As shown in FIG. 32, the base material 82 is thermally press-bonded to the resistive element 81, having the first face 81A and the second face 81B arranged to face in opposite directions in the thickness direction z. First, the plurality of slits 811 are formed in the resistive element 81, so as to penetrate therethrough from the first face 10A to the second face 81B. The plurality of slits 811 correspond to the plurality of slits 11 of the resistor A30. The plurality of slits 811 are formed through a wet etching process. Then the base material 82 is thermally press-bonded to the first face 81A, by an accumulation press method. When the base material 82 is press-bonded to the first face 81A, a part of the base material 82 intrudes into the plurality of slits 811, in the thickness direction z. Then the plurality of grooves 812 are formed in the resistive element 81, so as to recede from the second face 10B, with a probe for measuring the resistance value of the resistive element 81 kept in contact with the second face 10B. The plurality of grooves 812 correspond to the plurality of grooves 12 of the resistor A30. The plurality of grooves 12 may be formed, for example, by laser irradiation. When the resistance value of the resistive element 81 reaches a predetermined value, the formation of the plurality of grooves 812 is finished.

Figure 33:
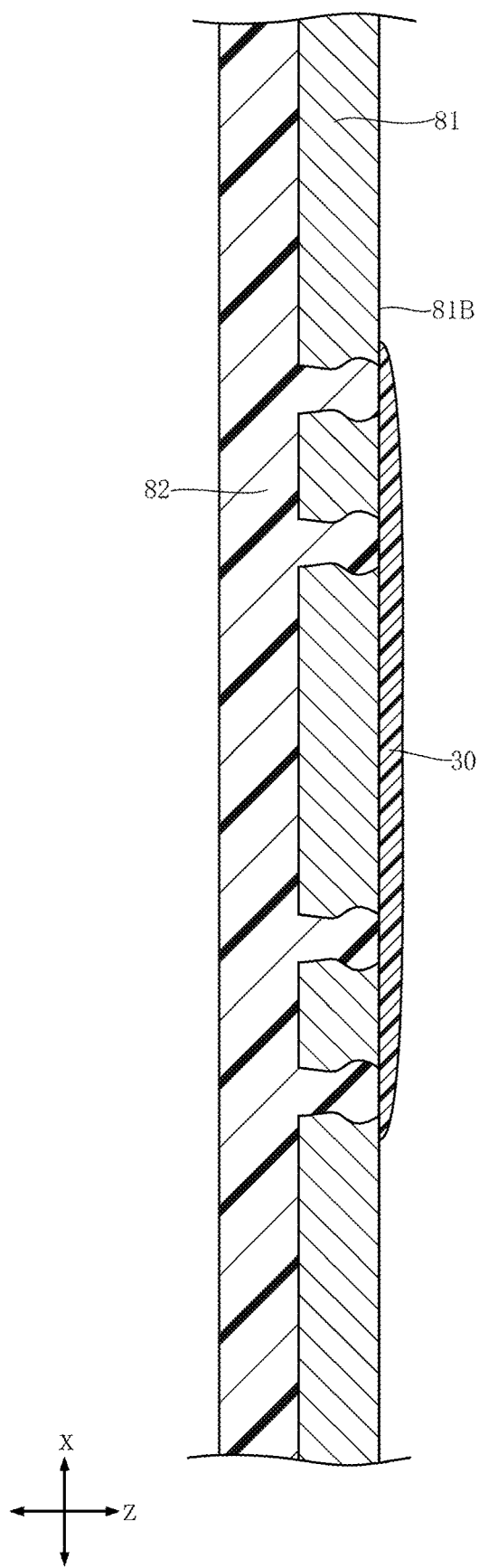
FIG. 33 is a cross-sectional view for explaining the manufacturing process of the resistor shown in FIG. 22.

Proceeding to FIG. 33, the protective film 30 is formed, so as to cover a part of each of the second face 81B of the resistive element 81, and of the surface of the base material 82 arranged to face in the same direction as the second face 81B. The protective film 30 may be formed through applying, by screen printing, a material containing an epoxy resin to the second face 81B, and the surface of the base material 82 arranged to face in the same direction as the second face 81B, and thermally curing the material.

Figure 34:
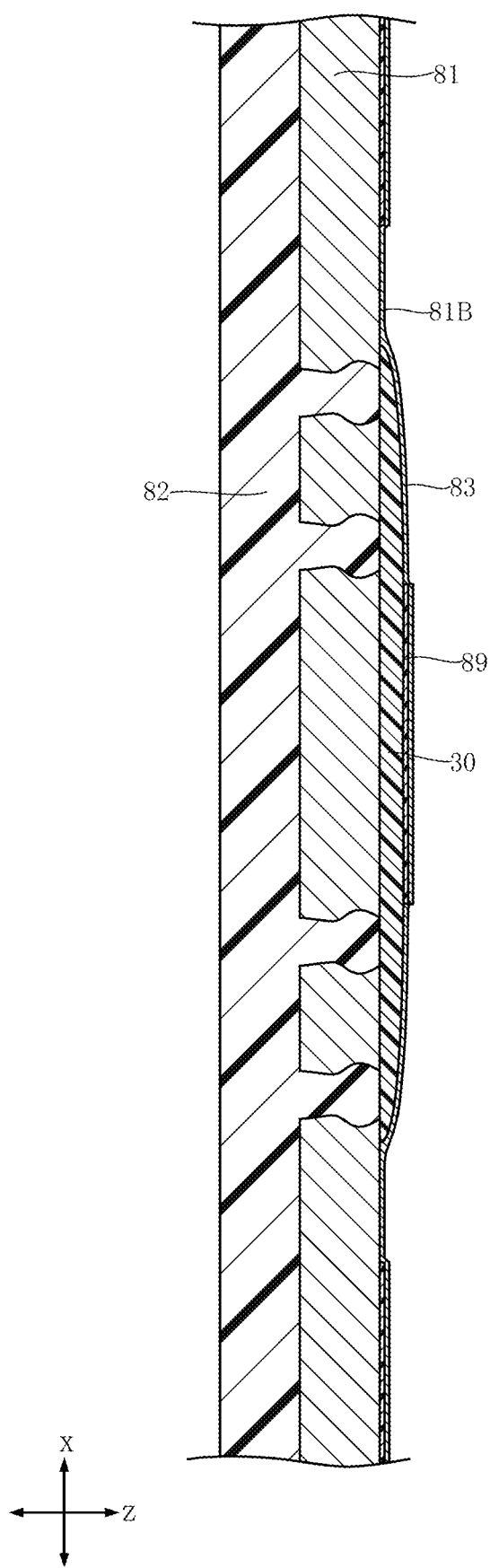
FIG. 34 is a cross-sectional view for explaining the manufacturing process of the resistor shown in FIG. 22.

Proceeding to FIG. 34, a metal thin film 83 is formed, so as to cover the entirety of the second face 81B of the resistive element 81, the surface of the base material 82 arranged to face in the same direction as the second face 81B, and the protective film 30. To form the metal thin film 83, first a mask layer 89 is formed so as to cover a part of each of the second face 81B of the resistive element 81, the surface of the base material 82 arranged to face in the same direction as the second face 81B, and the protective film 30. The mask layer 89 may be formed by screen printing. After forming the mask layer 89, the metal thin film 83 is formed. The metal thin film 83 is formed of a nickel—chrome alloy. The metal thin film 83 may be formed by sputtering. Through this process, the mask layer 89 is covered with the metal thin film 83.

Figure 35:
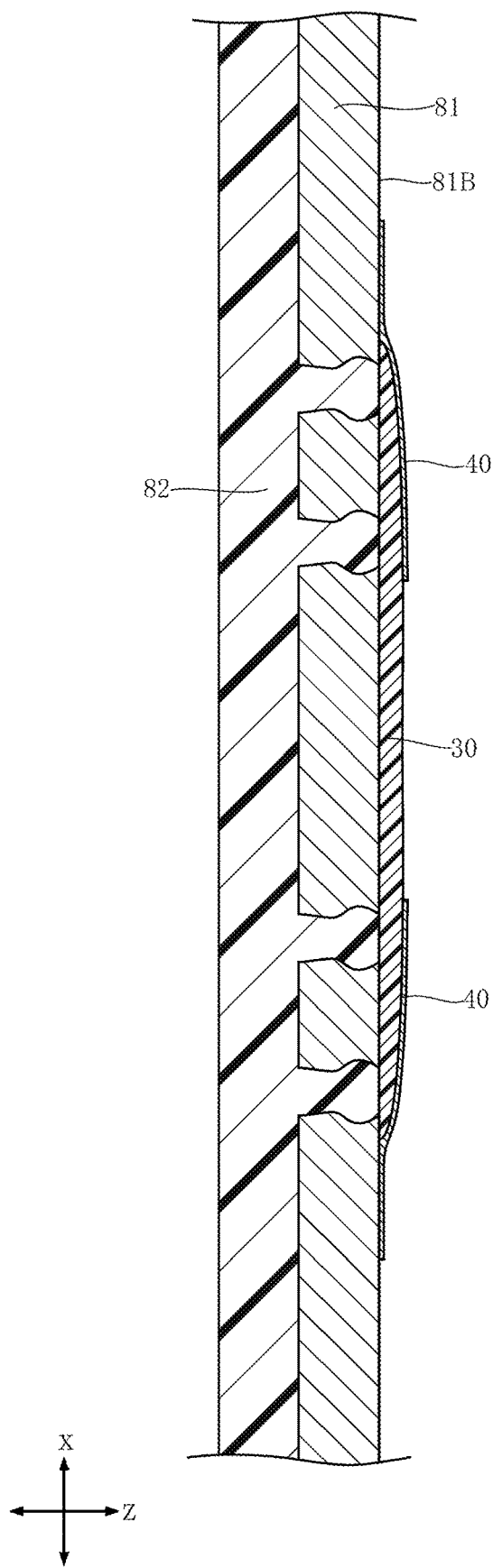
FIG. 35 is a cross-sectional view for explaining the manufacturing process of the resistor shown in FIG. 22.

Proceeding to FIG. 35, the mask layer 89 and a part of the metal thin film 83 covering the mask layer 89 are removed (lifted off). As result, the pair of intermediate layers 40, covering a part of each of the second face 81B of the resistive element 81, the surface of the base material 82 arranged to face in the same direction as the second face 81B, and the protective film 30, can be obtained. In other words, the pair of intermediate layers 40 are constituted of the metal thin film 83 remaining on the protective film 30 and other regions.

Figure 36:
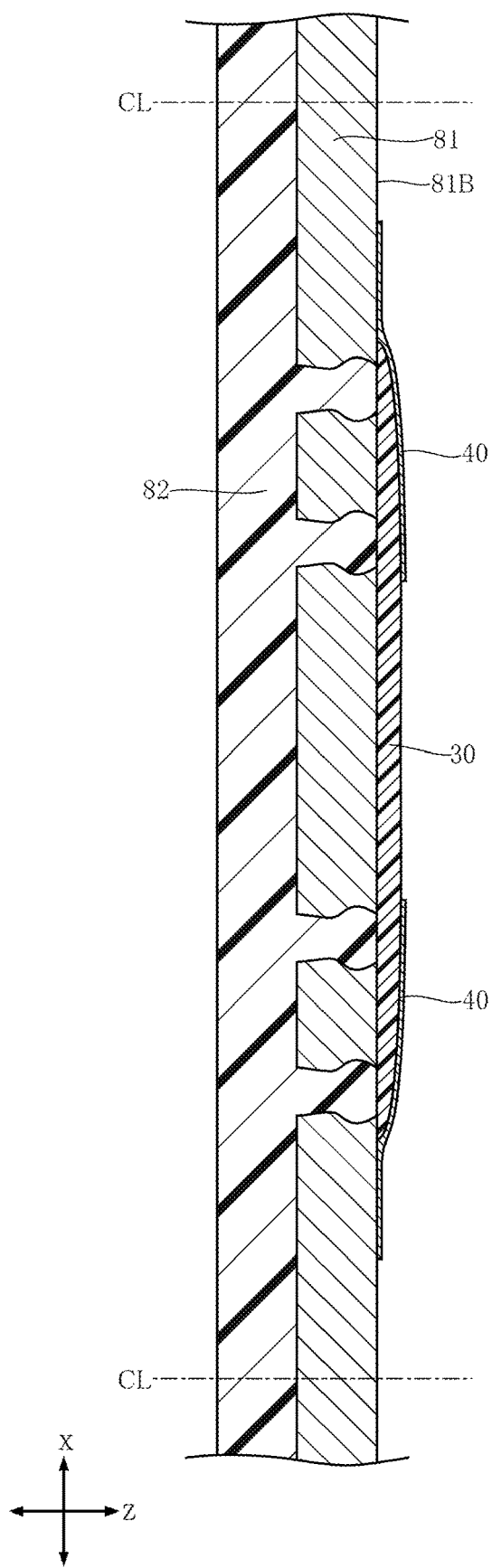
FIG. 36 is a cross-sectional view for explaining the manufacturing process of the resistor shown in FIG. 22.

Proceeding to FIG. 36, the resistive element 81 and the base material 82 are cut with a dicing blade along cutting lines CL, thus to be divided into individual pieces each including the protective film 30 and the pair of intermediate layers 40. Such individual pieces each constitute the element of the resistor A30, except the pair of electrodes 50. In other words, the resistive element 81 divided into the individual piece corresponds to the resistive element 10 of the resistor A30. Likewise, the base material 82 divided into the individual piece corresponds to the insulation plate 20 of the resistor A30. The pair of first end faces 10C of the resistive element 10, and the pair of second end faces 20A of the insulation plate 20 correspond to the cut section of the resistive element 81 and the base material 82, resultant from the mentioned cutting process.

Figure 37:
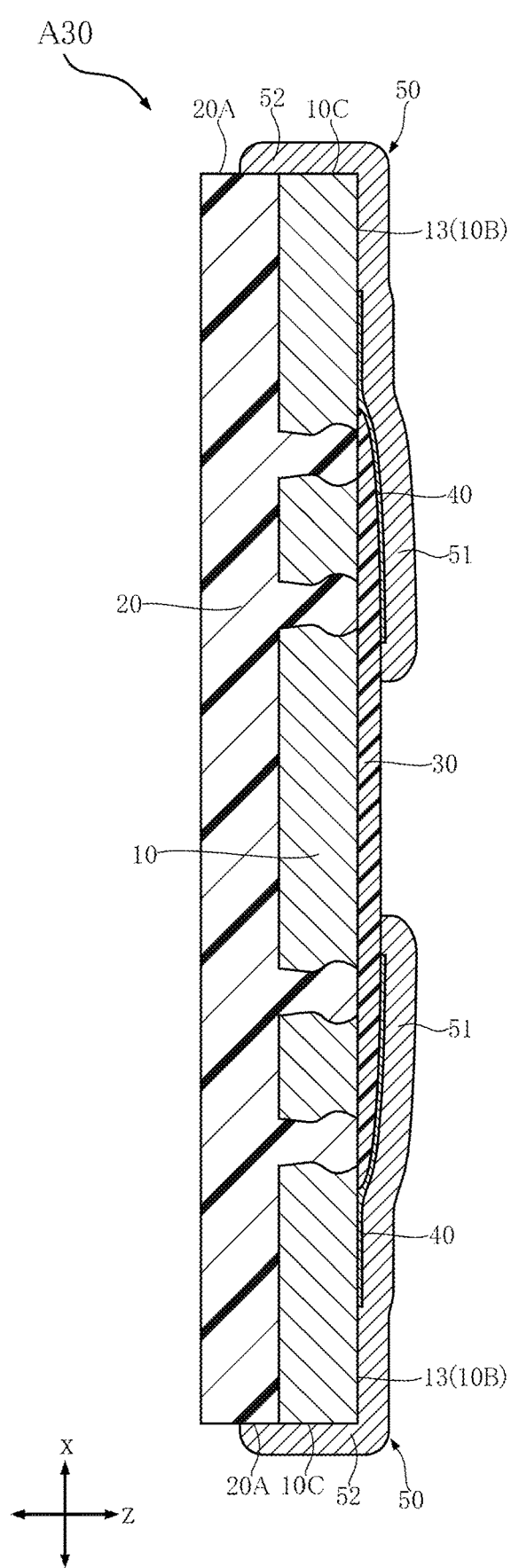
FIG. 37 is a cross-sectional view for explaining the manufacturing process of the resistor shown in FIG. 22.

Finally, as shown in FIG. 37, the pair of electrodes 50 are formed, in contact with the resistive element 10. The pair of electrodes 50 may be formed by sequentially depositing the copper layer, the nickel layer, and the tin layer, by electrolytic barrel plating. The pair of intermediate layers 40 are each covered with the bottom portion 51 of one of the pair of electrodes 50. The bottom portion 51 of each of the pair of electrodes 50 is in contact with the exposed region 13 of the second face 10B of the resistive element 10, and the protective film 30. Further, each of the pair of first end faces 10C of the resistive element 10, and a part of each of the pair of second end faces 20A of the insulation plate 20 are covered with the lateral portion 52 of one of the pair of electrodes 50. Thereafter, the pair of electrodes 50 are subjected to heat treatment, for two hours under the temperature of 170° C. As result, the adhesion strength between the bottom portion 51 of the pair of electrodes 50 and the resistive element 10 is improved. Throughout the foregoing process, the resistor A30 can be obtained.

Variation of Third Embodiment

Figure 38:
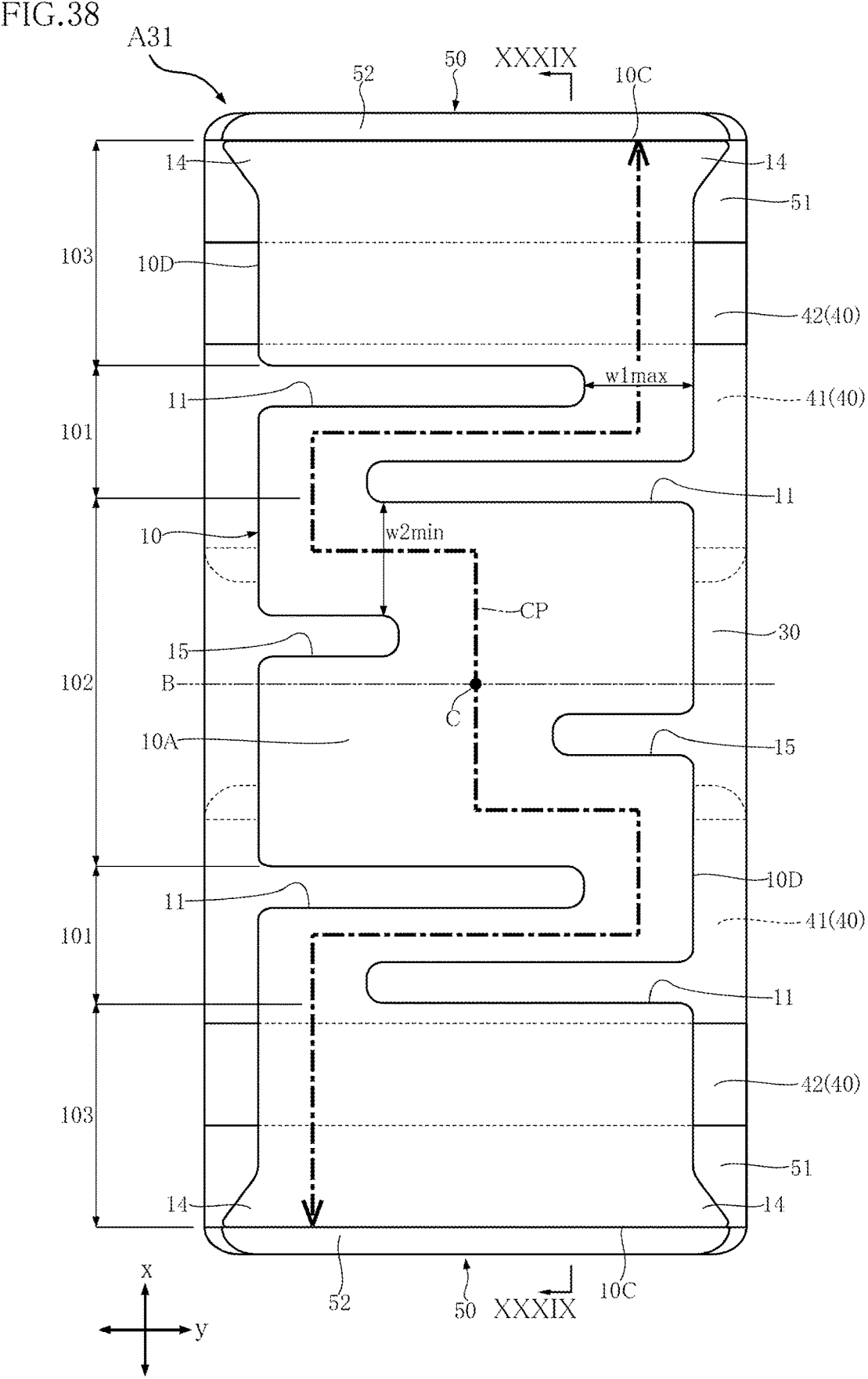
FIG. 38 is a plan view showing the resistor according to a variation of the third embodiment of the present disclosure, seen through the insulation plate.
Figure 39:
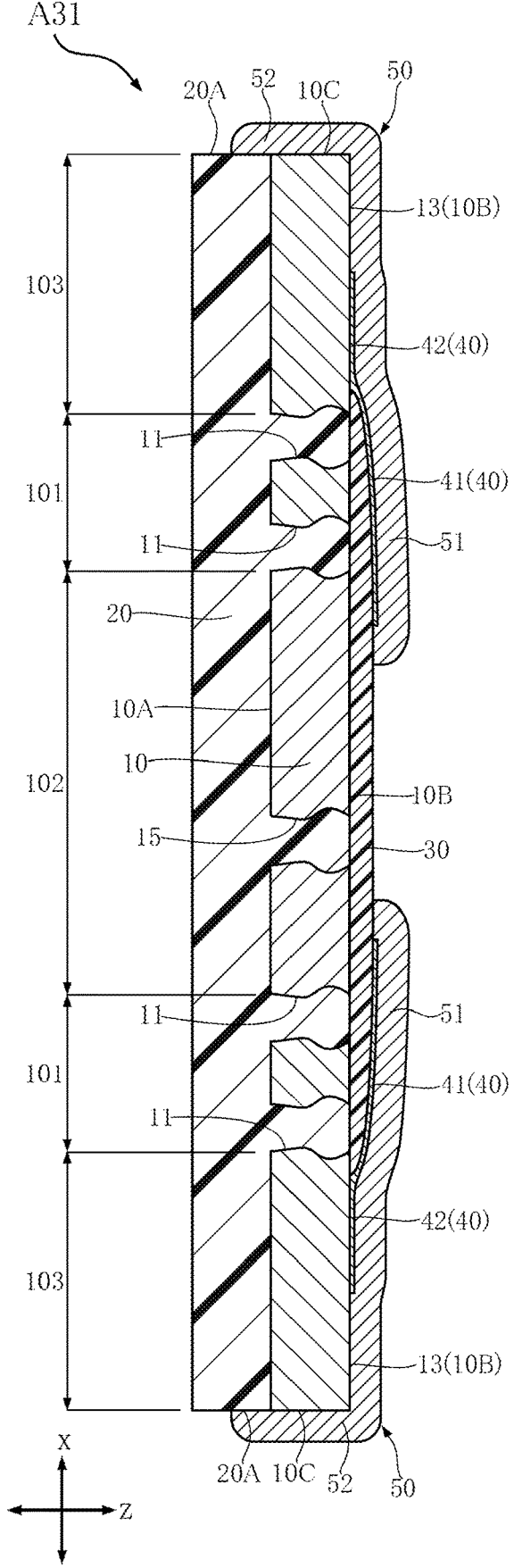
FIG. 39 is a cross-sectional view taken along a line XXXIX-XXXIX in FIG. 38.

Referring now to FIG. 38 and FIG. 39, a resistor A31 according to a variation of the third embodiment of the present disclosure will be described hereunder. The resistor A31 is different from the resistor A30, in the configuration of the resistive element 10. Here, FIG. 38 illustrates the view seen through the insulation plate 20, for the sake of clarity.

As shown in FIG. 38 and FIG. 39, the resistive element 10 of the resistor A31 includes a plurality of auxiliary slits 15. The plurality of auxiliary slits 15 are provided to adjust the resistance value of the resistive element 10 to a predetermined value, in collaboration with the plurality of slits 11 and the plurality of grooves 12. The plurality of auxiliary slits 15 are each formed so as to penetrate through the resistive element 10, from the first face 10A to the second face 10B. The plurality of auxiliary slits 15 each extend in the second direction y. Because of the presence of the plurality of auxiliary slits 15, the pair of side faces 10D each includes an opening at the corresponding position. The plurality of auxiliary slits 15 are formed in the second resistive region 102. The length (size in the second direction y) of each of the plurality of auxiliary slits 15 is shorter than the length (size in the second direction y) of each of the plurality of slits 11. Further, a part of the insulation plate 20 is filled in the plurality of auxiliary slits 15, in the thickness direction z. The number of auxiliary slits 15 may be determined as desired, depending on the resistance value required from the resistive element 10.

The resistor A30 provides the following advantageous effects.

In the resistor A30, the resistive element 10 includes the pair of first resistive regions 101 spaced apart from each other in the first direction x, and the second resistive region 102 located between the pair of first resistive regions 101. The pair of electrodes 50 located in contact with the resistive element 10 each include the bottom portion 51, located opposite to the insulation plate 20 with respect to the resistive element 10 in the thickness direction z. The pair of first resistive regions 101 each overlap with the bottom portion 51 of one of the pair of electrodes 50, as viewed in the thickness direction z. The maximum width w1max of the conduction path CP in each of the pair of first resistive regions 101 is narrower than the minimum width w2min of the conduction path CP in the second resistive region 102. Accordingly, the resistance value of the second resistive region 102 is relatively small, compared with that of each of the pair of first resistive regions 101. Therefore, heat generation in the second resistive region 102 can be suppressed, during the use of the resistor A30. In addition, heat generated in each of the pair of first resistive regions 101 during the use of the resistor A30 is dissipated through the bottom portion 51 of the pair of electrodes 50. With the resistor A30, consequently, the increase in temperature of the resistive element 10 can be evenly suppressed, during the use of the resistor A30.

The resistive element 10 includes the plurality of slits 11, penetrating therethrough from the first face 10A to the second face 10B. The plurality of slits 11 each extend in the second direction y. The plurality of slits 11 are formed in the pair of first resistive regions 101. The second resistive region 102 is located adjacent to one of the plurality of slits 11 farthest from one of the pair of electrodes 50, in the first direction x. Therefore, the pair of first resistive regions 101 and the second resistive region 102 can be distinguished from each other in the resistive element 10, depending on whether the plurality of slits 11 are included.

In the resistor A31, the resistive element 10 includes the auxiliary slits 15, each penetrating therethrough from the first face 10A to the second face 10B, and extending in the second direction y. The auxiliary slits 15 are formed in the second resistive region 102. Accordingly, even though a relatively high resistance value is required from the resistive element 10, such resistance value can be secured in the resistive element 10. In addition, the auxiliary slits 15 are shorter than each of the plurality of slits 11. Therefore, the minimum width w2min of the conduction path CP in the second resistive region 102 can be prevented from becoming narrower than the maximum width w1max of the conduction path CP in the pair of first resistive regions 101, despite the resistive element 10 including the auxiliary slits 15.

The shape of the resistive element 10 is point-symmetrical, as viewed in the thickness direction z. Accordingly, the resistance value of the resistive element 10 remains unchanged, irrespective of the polarity of the pair of electrodes 50. Such a configuration eliminates the need to confirm the polarity of the pair of electrodes 50, when mounting the resistor A30 on a circuit board.

The resistor A30 further includes the protective film 30, which is electrically insulative, and located on the second face 10B of the resistive element 10. The bottom portion 51 of each of the pair of electrodes 50 includes a portion overlapping with the protective film 30, as viewed in the thickness direction z. Such a configuration prevents a short circuit between the pair of electrodes 50, which may be provoked by solder bonding, when the resistor A30 is mounted on a circuit board. Moreover, increasing the surface area of the bottom portion 51 of each of pair of electrodes 50 to a maximum possible extent, within the extent that allows the short circuit between the pair of electrodes 50 to be prevented, leads to further improvement in heat dissipation performance of the resistor A30.

The resistor A30 further includes the pair of intermediate layers 40, each including the cover portion 41 covering a part of the protective film 30, and spaced apart from each other in the first direction x. The pair of intermediate layers 40 are electrically connected to the resistive element 10. In the resistor A30, the pair of intermediate layers 40 are formed of the metal thin film. The cover portion 41 of each of the pair of intermediate layers 40 is located between the protective film 30 and the bottom portion 51 of one of the pair of electrodes 50. Therefore, the bottom portion 51 of the pair of electrodes 50 covering a part of the protective film 30 can be formed by electrolytic barrel plating, in the process described with reference to FIG. 37.

The pair of connection regions 103 each include the bulges 14, each protruding in the second direction y from one of the pair of first end faces 10C. The bulges 14 are respectively connected to the pair of first end faces 10C. Accordingly, the cutting line CL can be determined using the bulges 14 as the index, in the process described with reference to FIG. 36. In addition, the area of the exposed region 13 is increased by the bulges 14, which results in increased adhesion strength between the bottom portion 51 of the pair of electrodes 50 and the resistive element 10. Such improvement in adhesion strength prevents formation of a defective portion in the bottom portion 51 of the pair of electrodes 50, when performing the electrolytic barrel plating to form the pair of electrodes 50, in the process described with reference to FIG. 37.

Fourth Embodiment

Figure 40:
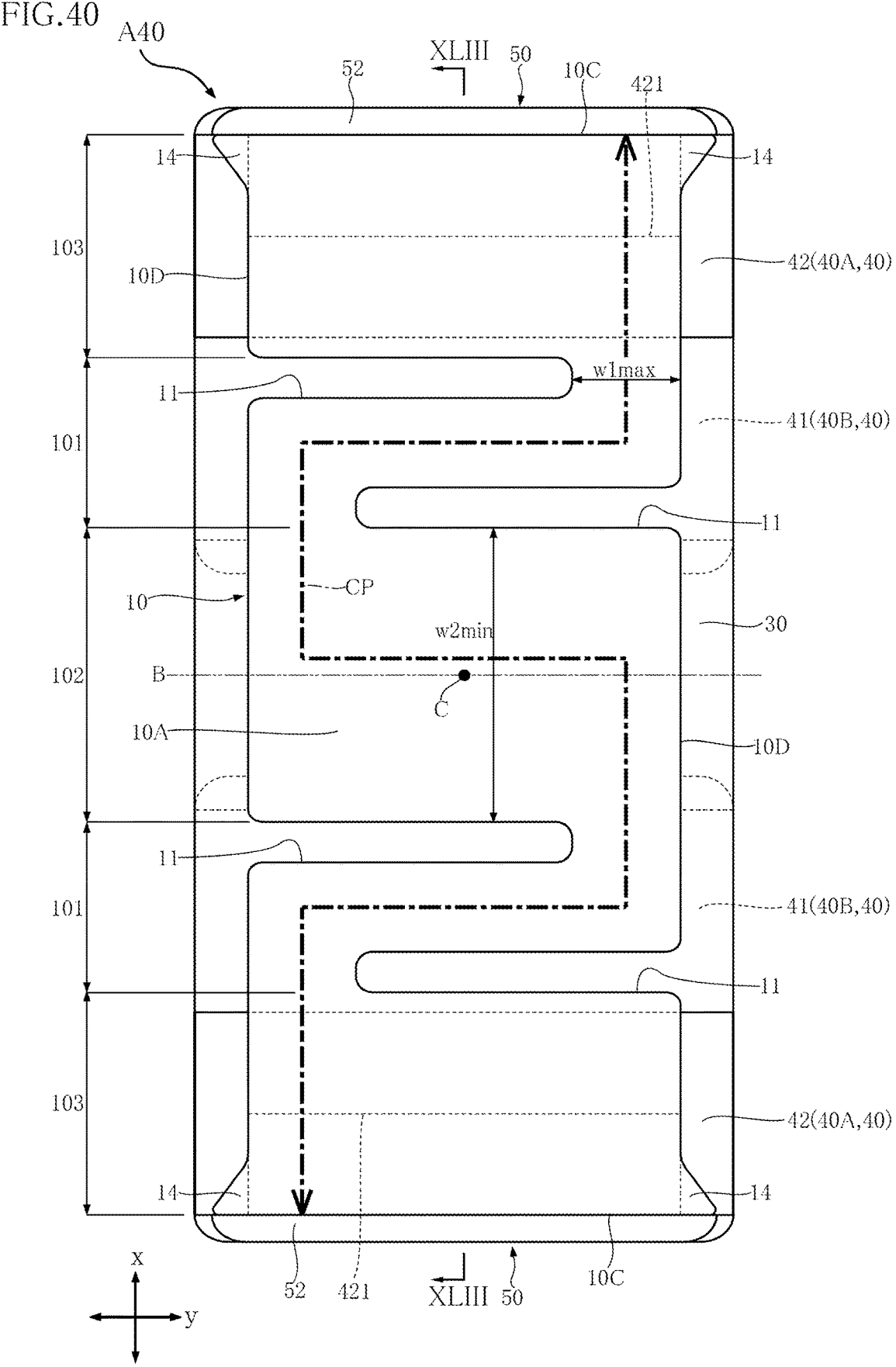
FIG. 40 is a plan view showing the resistor according to a fourth embodiment of the present disclosure, seen through the insulation plate.
Figure 41:
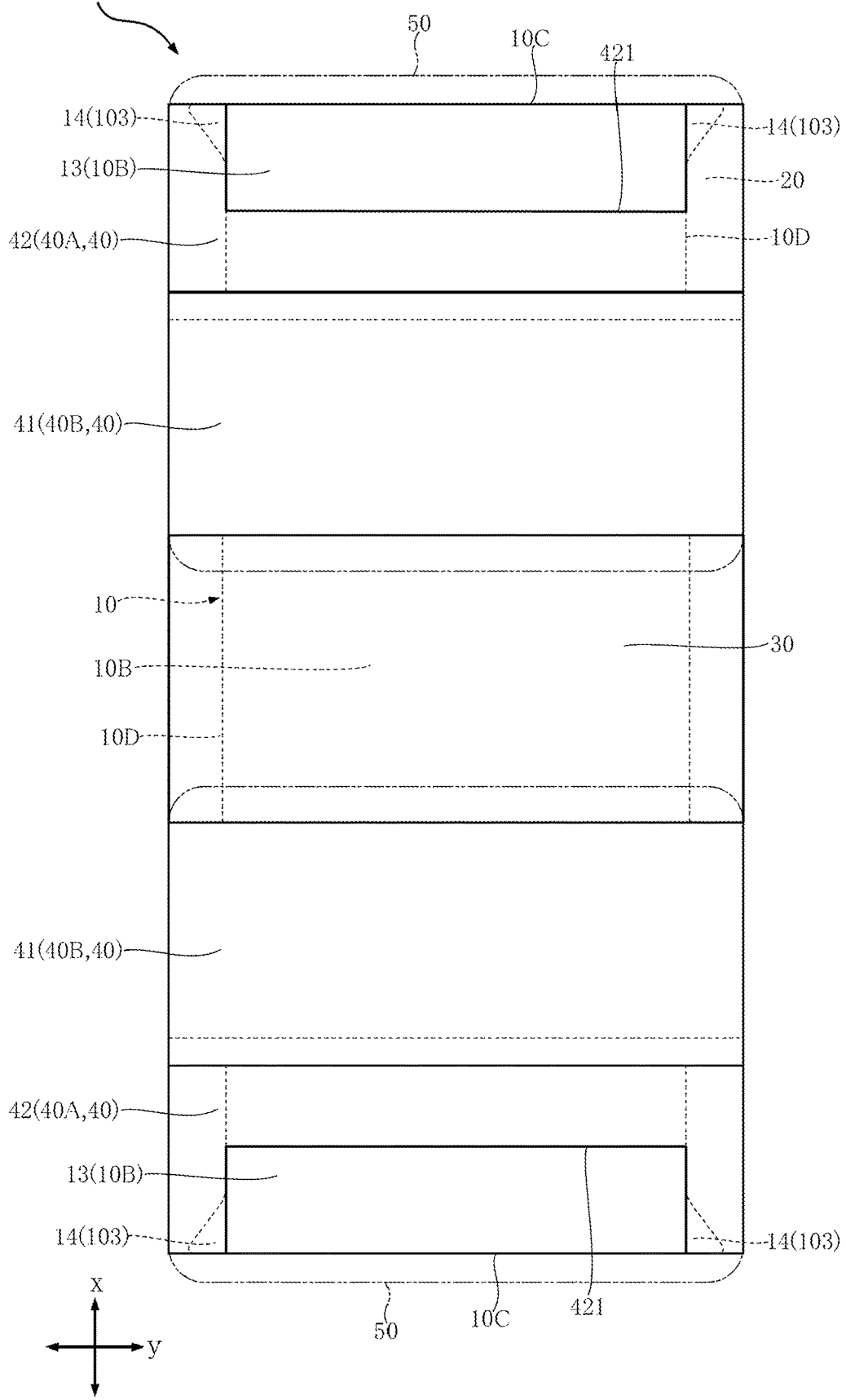
FIG. 41 is a bottom view of the resistor shown in FIG. 40, seen through the pair of electrodes.

Referring to FIG. 40 to FIG. 44, a resistor A40 according to a fourth embodiment of the present disclosure will be described hereunder. In these drawings, the elements same as or similar to those of the resistor A10 are given the same numeral, and the description of such elements will not be repeated. Here, FIG. 40 illustrates the view seen through the insulation plate 20, for the sake of clarity. FIG. 41 illustrates the view seen through the pair of electrodes 50, for the sake of clarity. In FIG. 41, the pair of electrodes 50 seen through are indicated by imaginary lines.

The resistor A40 is different from the resistor A30, in the configuration of the protective film 30 and the pair of intermediate layers 40.

In the resistor A40, the pair of intermediate layers 40 are formed of a material electrically conductive and containing a synthetic resin. The pair of intermediate layers 40 contain metal particles, which include silver. In the illustrated example of the resistor A40, the synthetic resin contained in the pair of intermediate layers 40 is an epoxy resin. The electrical resistivity of the pair of intermediate layers 40 is approximately ten times as high as that of the resistive element 10. In other words, the pair of intermediate layers 40 is higher in electrical resistivity, than the resistive element 10.

Figure 43:
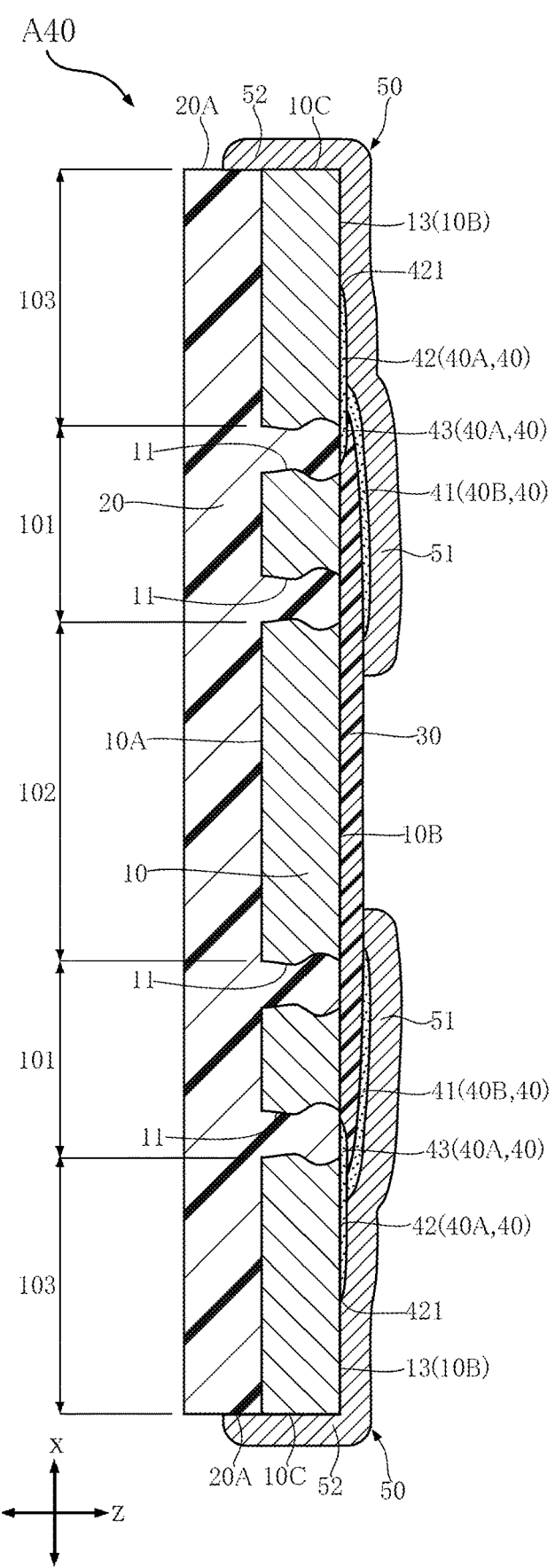
FIG. 43 is a cross-sectional view taken along a line XLIII-XLIII in FIG. 40.

As shown in FIG. 40, FIG. 41, and FIG. 43, the pair of intermediate layers 40 each include the first layer 40A and the second layer 40B. The first layer 40A includes the extended portion 42, and is in contact with both of the second face 10B of the resistive element 10 and the face of the insulation plate 20 arranged to face in the same direction as the second face 10B. The size of the first layer 40A in the thickness direction z is generally uniform over its entirety. The second layer 40B includes the cover portion 41. The second layer 40B is connected to the first layer 40A of one of the pair of intermediate layers 40. The second layer 40B is overlaid on a part of the first layer 40A.

Figure 42:
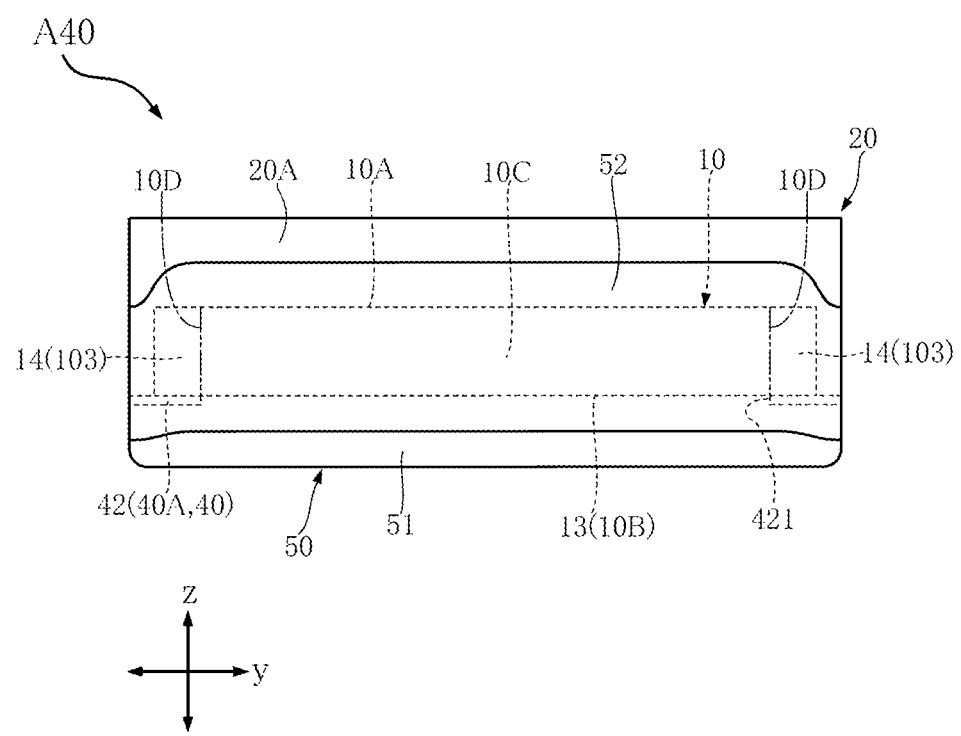
FIG. 42 is a front view of the resistor shown in FIG. 40.

As shown in FIG. 41 and FIG. 42, the extended portion 42 of each of the pair of intermediate layers 40 includes the recess 421. The recess 421 is formed so as to recede in the first direction x, from one of the pair of first end faces 10C. The recess 421 has a rectangular shape, as viewed in the thickness direction z. From the recess 421, the exposed region 13 of the second face 10B is exposed.

Figure 44:
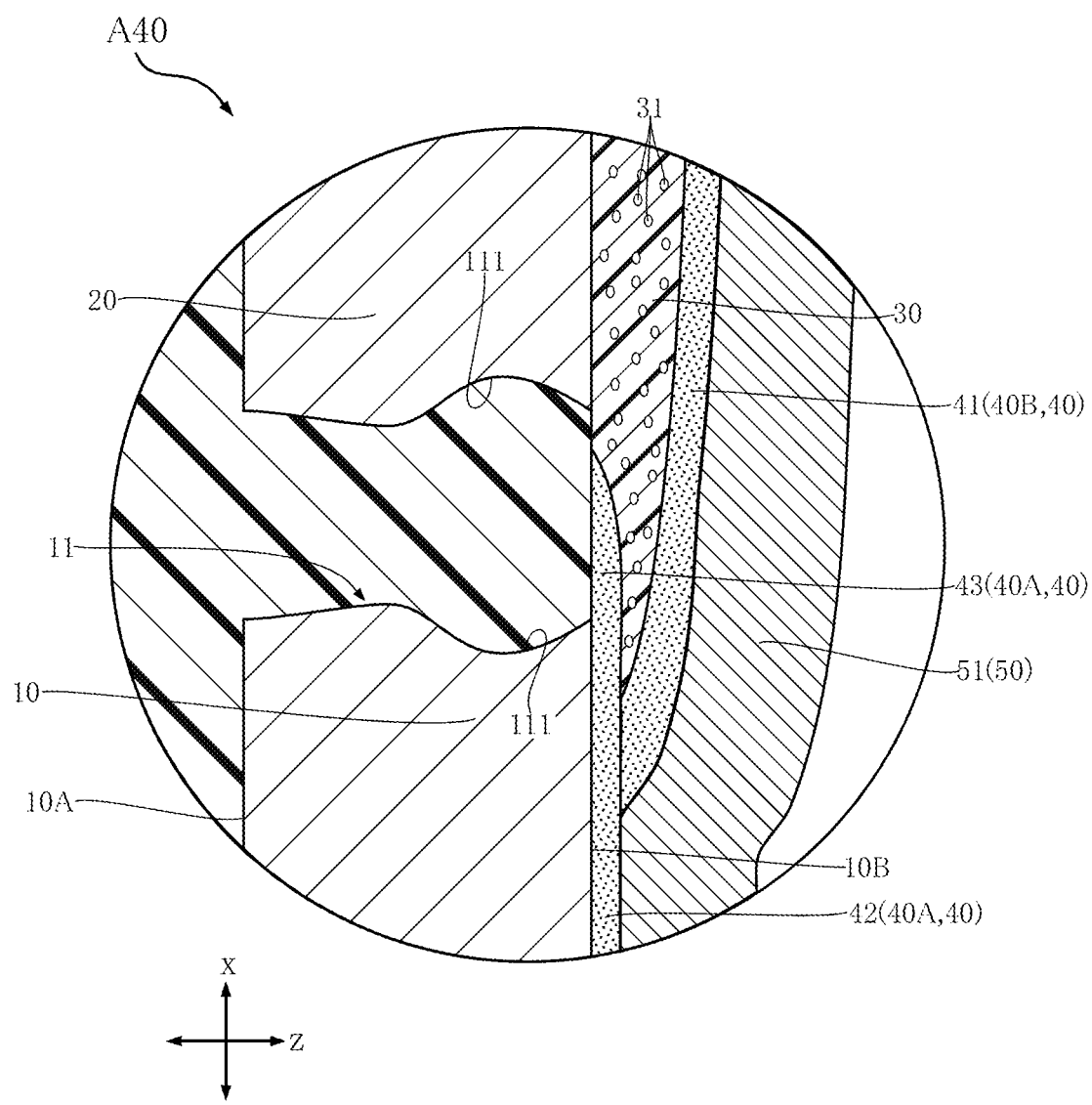
FIG. 44 is a partially enlarged cross-sectional view from FIG. 43.

As shown in FIG. 44, the first layer 40A of each of the pair of intermediate layers 40 includes the interposed portion 43, extending from the extended portion 42 toward the protective film 30. The interposed portion 43 includes the portion located between the resistive element 10 and the protective film 30. Accordingly, each of the end portions of the protective film 30 in the first direction x is overlaid on the first layer 40A of one of the pair of intermediate layers 40. In the resistor A40, the interposed portion 43 is in contact with both of the resistive element 10 and the protective film 30.

Figure 45:
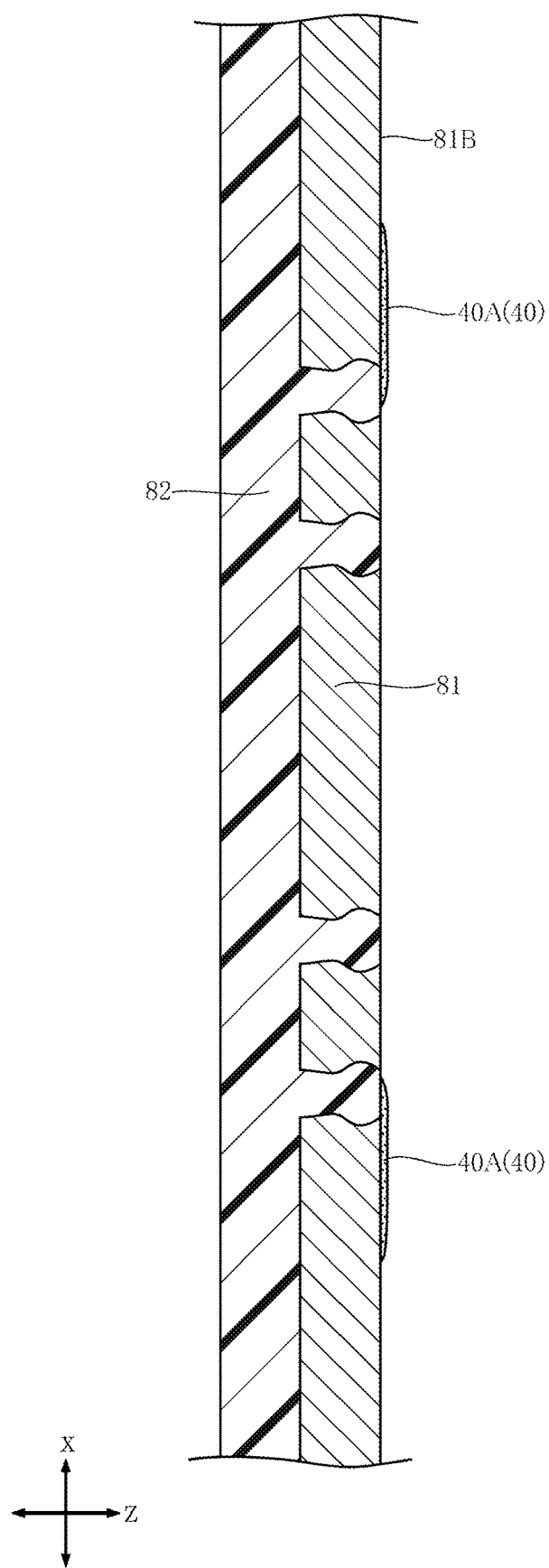
FIG. 45 is a cross-sectional view for explaining a manufacturing process of the resistor shown in FIG. 40.
Figure 46:
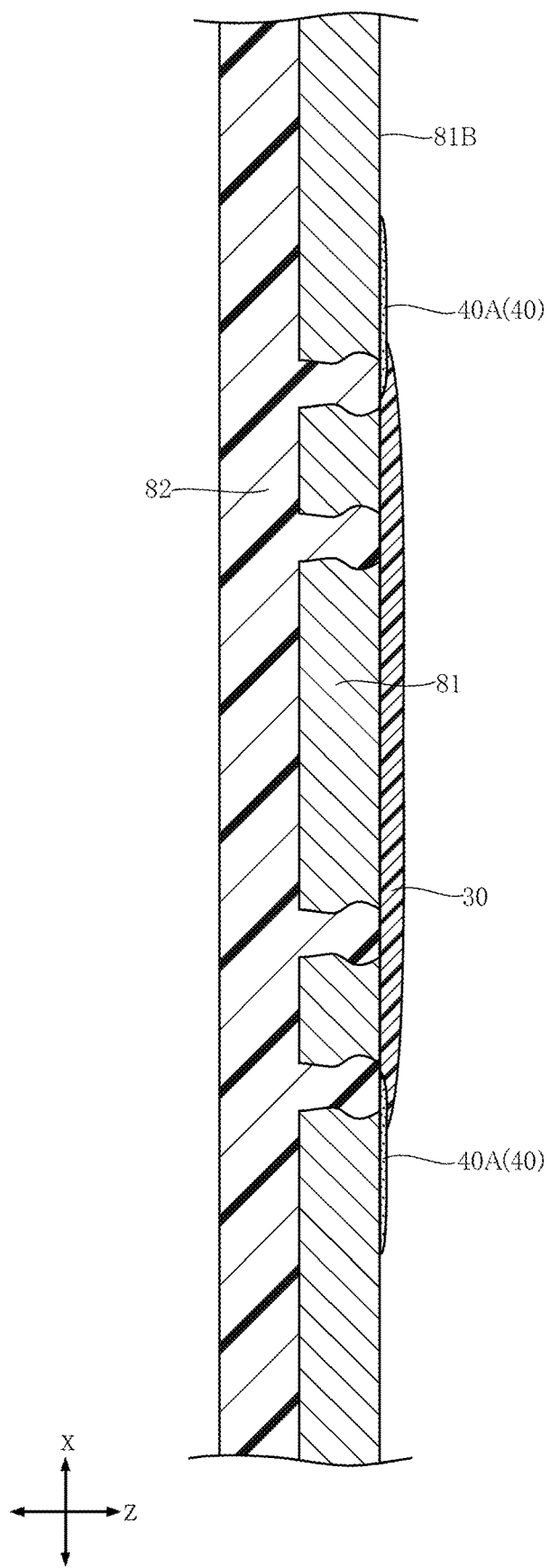
FIG. 46 is a cross-sectional view for explaining the manufacturing process of the resistor shown in FIG. 40.
Figure 47:
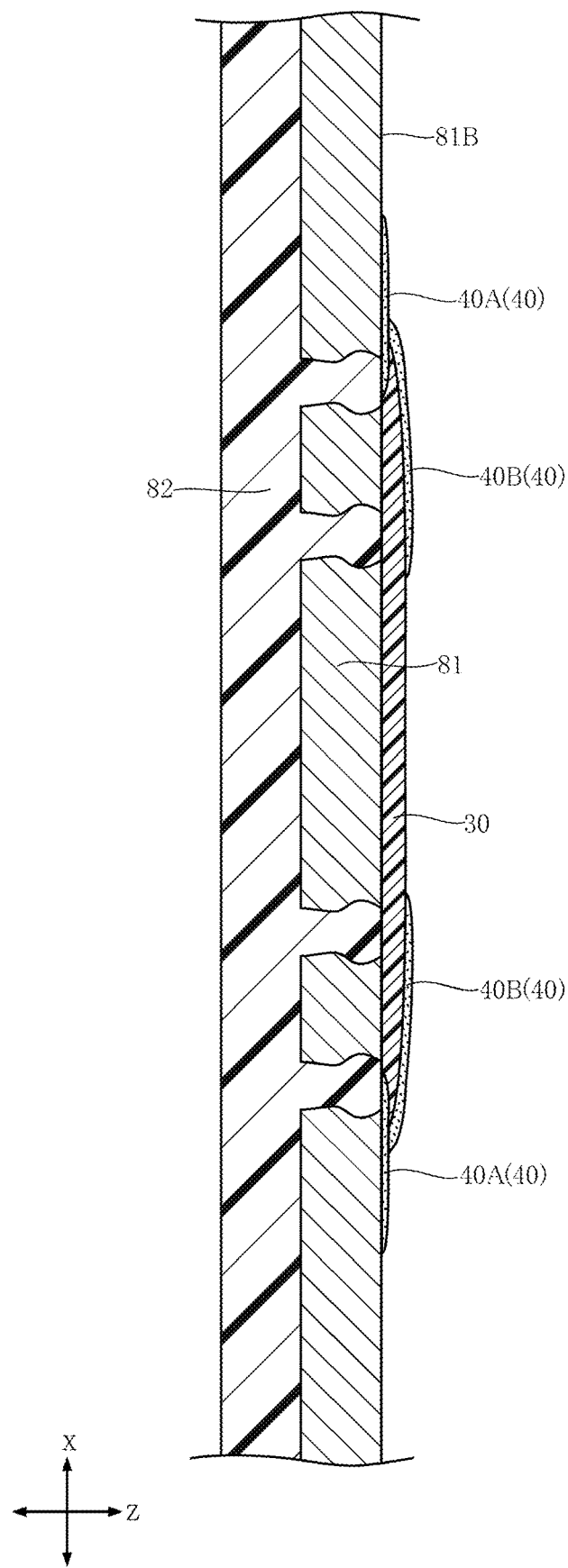
FIG. 47 is a cross-sectional view for explaining the manufacturing process of the resistor shown in FIG. 40.

Referring to FIG. 32, FIG. 36, FIG. 37, and FIG. 45 to FIG. 47, an exemplary manufacturing method of the resistor A40 will be described hereunder. Here, FIG. 45 to FIG. 47 represent the same cross-sectional position as FIG. 43.

Referring first to FIG. 32, the base material 82 is thermally press-bonded to the resistive element 81, having the first face 81A and the second face 81B arranged to face in opposite directions in the thickness direction z. Since this process is the same as the process in the manufacturing method of the resistor A30, further description will be skipped.

Proceeding to FIG. 45, the first layer 40A of the pair of intermediate layers 40 is formed, so as to cover a part of each of the second face 81B of the resistive element 81, and the face of the base material 82 arranged to face in the same direction as the second face 81B. To form the first layer 40A of the pair of intermediate layers 40, a material containing silver particles and an epoxy resin is applied, by screen printing, to both of the second face 81B and the face of the base material 82 arranged to face in the same direction as the second face 81B. Such material is applied to positions spaced apart from each other in the first direction x. Then upon thermally curing the material, the first layer 40A of the pair of intermediate layers 40 can be obtained.

Proceeding to FIG. 46, the protective film 30 is formed, so as to cover a part of each of the second face 81B of the resistive element 81, and the face of the base material 82 arranged to face in the same direction as the second face 81B. First, a material containing an epoxy resin is applied, by screen printing, to the second face 81B and the face of the base material 82 arranged to face in the same direction as the second face 81B. In this process, each of the end portions of the material in the first direction x is overlaid on a part of the first layer 40A of one of the pair of intermediate layers 40. Then upon thermally curing the material, the protective film 30 can be obtained.

Proceeding to FIG. 47, the second layer 40B of the pair of intermediate layers 40 is formed, so as to cover a part of the protective film 30. First, a material containing silver particles and an epoxy resin is applied, by screen printing, to the protective film 30. The material is applied to positions spaced apart from each other in the first direction x. In addition, each of the materials applied to the positions spaced apart from each other is laid over a part of the first layer 40A of one of the pair of intermediate layers 40. Then upon thermally curing the material, the second layer 40B of the pair of intermediate layers 40 can be obtained.

Returning to FIG. 36, the resistive element 81 and the base material 82 are cut with a dicing blade along the cutting lines CL, thus to be divided into individual pieces each including the protective film 30 and the pair of intermediate layers 40 (first layer 40A and second layer 40B). Since this process is the same as the process in the manufacturing method of the resistor A30, further description will be skipped.

Finally, as shown in FIG. 37, the pair of electrodes 50 are formed, in contact with the resistive element 10. Since this process is the same as the process in the manufacturing method of the resistor A30, further description will be skipped. Throughout the foregoing process, the resistor A40 can be obtained.

The resistor A40 provides the following advantageous effects.

In the resistor A40, the resistive element 10 includes the pair of first resistive regions 101 spaced apart from each other in the first direction x, and the second resistive region 102 located between the pair of first resistive regions 101.

The pair of electrodes 50 located in contact with the resistive element 10 each include the bottom portion 51, located opposite to the insulation plate 20 with respect to the resistive element 10 in the thickness direction z. The pair of first resistive regions 101 each overlap with the bottom portion 51 of one of the pair of electrodes 50, as viewed in the thickness direction z. The maximum width w1max of the conduction path CP in each of the pair of first resistive regions 101 is narrower than the minimum width w2min of the conduction path CP in the second resistive region 102. Therefore, with the resistor A40 also, the increase in temperature of the resistive element 10 can be evenly suppressed, during the use of the resistor A40.

In the resistor A40, the pair of intermediate layers 40 are formed of the material containing a synthetic resin containing metal particles. Accordingly, the protective film 30 and the pair of intermediate layers 40 are both formed of the same type of material, which leads to improved adhesion strength between the protective film 30 and the cover portion 41 of the pair of intermediate layers 40. Further, since electrical conductivity can be secured in the material of the pair of intermediate layers 40, the pair of intermediate layers 40 can be electrically connected to the resistive element 10.

In the resistor A40, the pair of intermediate layers 40 are higher in electrical resistivity than the resistive element 10. Accordingly, the current flowing in the resistive element 10 is impeded from flowing in the pair of intermediate layers 40, during the use of the resistor A40. Therefore, fluctuation in resistance value of the resistor A40, arising from the influence of the pair of intermediate layers 40, can be suppressed.

The present disclosure is not limited to the foregoing embodiments. The specific configuration of each of the elements in the present disclosure may be modified in various manners.

The invention claimed is:

1. A resistor comprising:
a resistive element having a first face arranged to face in a thickness direction;
an insulation plate disposed on the first face; and
a pair of electrodes spaced apart from each other in a first direction perpendicular to the thickness direction, and each disposed in contact with the resistive element,
wherein the pair of electrodes each include a bottom portion disposed on an opposite side of the insulation plate with respect to the resistive element, in the thickness direction,
the resistive element includes a pair of first resistive regions spaced apart from each other in the first direction, a second resistive region disposed between the pair of first resistive regions, and a pair of connection regions each disposed in contact with one of the pair of electrodes, and each connected to one of the pair of first resistive regions,
the pair of first resistive regions each overlap with the bottom portion of one of the pair of electrodes, as viewed in the thickness direction,
a maximum width of a conduction path in the pair of first resistive regions is narrower than a minimum width of the conduction path in the second resistive region,
the resistive element includes a second face arranged to face in an opposite direction to the first face,
the resistive element includes a plurality of slits penetrating therethrough from the first face to the second face, and extending in a second direction perpendicular to both of the thickness direction and the first direction, the plurality of slits are formed in the pair of first resistive regions,
the second resistive region is disposed adjacent to one of the plurality of slits farthest from one of the pair of electrodes in the first direction,
the resistive element includes an auxiliary slit penetrating therethrough from the first face to the second face, and extending in the second direction,
the auxiliary slit is formed in the second resistive region, and
the auxiliary slit is shorter than each of the plurality of slits.

2. The resistor according to claim 1, wherein a shape of the resistive element is point-symmetrical, as viewed in the thickness direction.

3. The resistor according to claim 1, wherein the resistive element includes a pair of end faces connected to both of the first face and the second face, and spaced apart from each other in the first direction,
the pair of electrodes are each connected to the bottom portion of one of the pair of electrodes, and each include a lateral portion erected in the thickness direction, and
the lateral portion of each of the pair of electrodes is in contact with one of the pair of end faces.

4. The resistor according to claim 3, wherein the lateral portion of each of the pair of electrodes is in contact with the insulation plate.

5. The resistor according to claim 3, wherein the resistive element includes a pair of side faces connected to both of the first face and the second face, and spaced apart from each other in the second direction,
the insulation plate is formed of a material containing a synthetic resin, and
the pair of side faces are covered with the insulation plate.

6. The resistor according to claim 5, wherein a part of the insulation plate is filled in the plurality of slits, in the thickness direction.

7. The resistor according to claim 6, wherein the plurality of slits each include a pair of sidewalls spaced apart from each other in the first direction, and
the pair of sidewalls each include a concave portion recessed in the first direction.

8. The resistor according to claim 5, wherein the pair of connection regions each include a bulge protruding in the second direction from one of the pair of side faces, and
the bulge is connected to one of the pair of end faces.

9. The resistor according to claim 3, further comprising a protective film disposed on the second face, wherein the protective film is formed of a material containing a synthetic resin, and
the bottom portion of each of the pair of electrodes includes a portion overlapping with a part of the protective film, as viewed in the thickness direction.

10. The resistor according to claim 9, wherein the protective film contains a filler formed of a material including a ceramic.

11. The resistor according to claim 9, wherein the resistive element includes a plurality of grooves recessed from the second face, and extending in a predetermined direction, and
the protective film is meshed with the plurality of grooves.

12. The resistor according to claim 9, further comprising a pair of intermediate layers each including a cover portion covering a part of the protective film, and spaced apart from each other in the first direction,
wherein the pair of intermediate layers are electrically connected to the resistive element, and the cover portion of each of the pair of intermediate layers is disposed between the protective film and the bottom portion of one of the pair of electrodes.

13. The resistor according to claim 12, wherein the protective film is disposed on an inner side in the first direction with respect to the pair of end faces, as viewed in the thickness direction, the second face includes an exposed region disposed between one of the pair of end faces and the protective film, as viewed in the thickness direction, and uncovered with the pair of intermediate layers, and the bottom portion of each of the pair of electrodes is in contact with the exposed region.

14. The resistor according to claim 13, wherein the pair of intermediate layers are formed of a metal thin film.

15. The resistor according to claim 13, wherein the pair of intermediate layers are formed of a material containing a synthetic resin containing metal particles, and the pair of intermediate layers are higher in electrical resistivity than the resistive element.

16. A resistor comprising:

a resistive element having a first face arranged to face in a thickness direction;

an insulation plate disposed on the first face; and a pair of electrodes spaced apart from each other in a first direction perpendicular to the thickness direction, and each disposed in contact with the resistive element, wherein the pair of electrodes each include a bottom portion disposed on an opposite side of the insulation plate with respect to the resistive element, in the thickness direction, the resistive element includes a pair of first resistive regions spaced apart from each other in the first direction, a second resistive region disposed between the pair of first resistive regions, and a pair of connection regions each disposed in contact with one of the pair of electrodes, and each connected to one of the pair of first resistive regions, the pair of first resistive regions each overlap with the bottom portion of one of the pair of electrodes, as viewed in the thickness direction, a maximum width of a conduction path in the pair of first resistive regions is narrower than a minimum width of the conduction path in the second resistive region, the resistive element includes a pair of end faces connected to the first face, and spaced apart from each other in the first direction, the pair of electrodes are each connected to the bottom portion of one of the pair of electrodes, and each include a lateral portion erected in the thickness direction, and the lateral portion of each of the pair of electrodes is in contact with one of the pair of end faces.

* * * * *